(12) United States Patent
El Dokor et al.

(10) Patent No.: US 11,816,829 B1
(45) Date of Patent: *Nov. 14, 2023

(54) COLLABORATIVE DISPARITY DECOMPOSITION

(71) Applicant: GOLDEN EDGE HOLDING CORPORATION, Santa Clara, CA (US)

(72) Inventors: Tarek El Dokor, Phoenix, AZ (US); Jordan Cluster, Tempe, AZ (US)

(73) Assignee: Golden Edge Holding Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/074,507

(22) Filed: Dec. 4, 2022

Related U.S. Application Data

(63) Continuation of application No. 17/100,925, filed on Nov. 22, 2020, now Pat. No. 11,521,311, which is a (Continued)

(51) Int. Cl.
*G06T 7/00* (2017.01)
*G06T 7/536* (2017.01)
(Continued)

(52) U.S. Cl.
CPC .............. *G06T 7/0008* (2013.01); *G06T 7/11* (2017.01); *G06T 7/174* (2017.01); *G06T 7/187* (2017.01);
(Continued)

(58) Field of Classification Search
CPC . G06T 2207/10012; G06T 2207/10021; G06T 2207/10024; G06T 2207/20061;
(Continued)

(56) References Cited

U.S. PATENT DOCUMENTS 10,846,844 B1 * 11/2020 El Dokor .............. G06T 7/0008
11,521,311 B1 * 12/2022 El Dokor ................ G06T 7/536
(Continued)

OTHER PUBLICATIONS

Barnard, S. (1982). *InterpretingPerspecitiveImages*. Menlo Park: SRI International. Retrieved from http://www.sri.com/sites/defauit/files/uploads/publications/pdf/672.pdf.
(Continued)

*Primary Examiner* — Michael J Vanchy, Jr.
(74) *Attorney, Agent, or Firm* — Kilpatrick Townsend & Stockton LLP

(57) ABSTRACT

A novel disparity computation technique is presented which comprises multiple orthogonal disparity maps, generated from approximately orthogonal decomposition feature spaces, collaboratively generating a composite disparity map. Using an approximately orthogonal feature set extracted from such feature spaces produces an approximately orthogonal set of disparity maps that can be composited together to produce a final disparity map. Various methods for dimensioning scenes and are presented. One approach extracts the top and bottom vertices of a cuboid, along with the set of lines, whose intersections define such points. It then defines a unique box from these two intersections as well as the associated lines. Orthographic projection is then attempted, to recenter the box perspective. This is followed by the extraction of the three-dimensional information that is associated with the box, and finally, the dimensions of the box are computed. The same concepts can apply to hallways, rooms, and any other object.

18 Claims, 16 Drawing Sheets

Related U.S. Application Data continuation of application No. 16/240,754, filed on Jan. 6, 2019, now Pat. No. 10,846,844, which is a continuation of application No. 15/863,952, filed on Jan. 7, 2018, now Pat. No. 10,176,564, which is a continuation of application No. 14/628,278, filed on Feb. 22, 2015, now Pat. No. 9,865,045.

(60) Provisional application No. 62/054,398, filed on Sep. 24, 2014, provisional application No. 61/994,963, filed on May 18, 2014.

(51) Int. Cl.
| | | |
|---|---|---|
| *G06T 7/593* | (2017.01) | |
| *G06T 7/11* | (2017.01) | |
| *G06T 7/187* | (2017.01) | |
| *G06T 7/174* | (2017.01) | |

(52) U.S. Cl.
CPC ............ *G06T 7/536* (2017.01); *G06T 7/593* (2017.01); *G06T 2207/10012* (2013.01); *G06T 2207/10021* (2013.01); *G06T 2207/10024* (2013.01); *G06T 2207/20061* (2013.01)

(58) Field of Classification Search
CPC ......... G06T 7/0008; G06T 7/11; G06T 7/174; G06T 7/187; G06T 7/536; G06T 7/593
See application file for complete search history.

(56) References Cited

U.S. PATENT DOCUMENTS

| | | | |
|---|---|---|---|
| 2010/0079450 A1 | 4/2010 | Pizlo et al. | |
| 2012/0243774 A1* | 9/2012 | Chen ........................ | G06T 5/50 382/154 |
| 2013/0144569 A1 | 6/2013 | Abe et al. | |

OTHER PUBLICATIONS

Bleyer, M., Rother, C., & Kohli, P. (2010). Surface Stereo with Soft Segmentation. *Computer Vision and Pattern Recognition*. IEEE.
Criminisi, A., Reid, I., & Zisserman, A. (Nov. 2000). Single View Metrology. *International Journal of Computer Vision*, 40(2), 123-148.
Desolneux, A., Moisan, L., & Moreal, J.-M. (2008). *From Gestalt Theory to Image Analysis*. New York: Springer Science+Business Media, LLC.
Furukawa, Y., Curless, B., Sietz, S. M., & Szeliski, R. (2009). Manhattan-world Stereo. *IEEE Conference on Computer Vision and Pattern Recognition*, (pp. 1422-1409). doi:http://doi.ieeecomputersociety.org/10.1109/CVPRW.2009.5206867.
Haralick, R. (1980). Using Perspective Transformations in Scene Analysis. *Computer Graphics and Image Processing*, 13, 191-221. Retrieved from http://haralick.org/journals/using_perspective_transformations_1980.pdf.
Hedau, V., Hoiem, D., & Forsyth, D. (2009). Recovering the Spatial Layout of Cluttered Rooms. *Twelfth IEEE Internatianai Conference on Computer Vision*. Retrieved from http://vision.cs.uiuc/edu/~vhedau2/Research/research_spatialLayouthtml.
Hedau, V., Hoiem, D., & Forsyth, D. (2010). Thinking Inside the Box: Using Appearance Models and Context Based on Room Geometry. *Eleventh European Conference on Computer Vision*. Retrieved from http://vision.cs.uiuc.edu/~vhedau2/Publications/eccv2010__think__inside.pdf.
Hoeim, D., Rother, C., & Winn, J. (2007). 3D LayoutCRF for Multi-View Object Class Recognition and Segmentation. *Proc. IEEE Computer Vision and Pattern Recognition (CVPR)*.
Hoiem, D., Efros, A. A., & Hebert, M. (2008). Putting Objects in Perspective. *International Journal of Computer Vision*, 80(1), 3-15.
Kanatani, K. (1988). Constraints on Length and Angle. *Computer Vision, Graphics, and Image Processing*, 41, 28-42. Retrieved from http://www.iim.cs.tut.ac.jp/~kanatani/papers/cvgip41-88.pdf.
Kanatani, K. (1993). *Geometric Computation for Machine Vision*. New York: Oxford University Press.
Kannala, J., & Brandt, S. S. (Aug. 2006). A Generic Camera Model and Calibration Method for Conventional, Wide-Angle, and Fish-Eye Lenses. *IEEE Transactions on Pattern Analysis & Machine Intelligence*, 28(8), 1335-1340. doi:http://doi.ieeecomputersociety.org/10.1109/TPAMI.2006.153.
Kannala, J., Heikkilä, J., & S. Brandt, S. (2008). Geometric Camera Calibration. In *Wiley Encyclopedia of Computer Science and Engineering*. Wiley Interscience.
Liebowitz, D., & Zisserman, A. (1998). Metric rectification for perspective images of planes. *Computer Vision and Pattern Recognition*, (pp. 482-488).
Rother, C. (2000). A new Approach for Vanishing Point Detection in Architectural Environments. Bristol: Proceedings of the 11th British Machine Vision Conference.
Rother, C. (Aug. 2002). A New Approach to Vanishing Point Detection in Architectural Environments. *Image and Vision Computing*, 20(9-10), 647-655. doi:http://dx.doi.org/10.1016/S0262-8856(02)00054-9.
Tardif, J. P. (2009). Non-iterative approach for fast and accurate vanishing point detection. *Computer Vision, 2009 IEEE 12th International Conference on*, (pp. 1250-1257).
Von Gioi, R. G., Jakubowicz, J., Morel, J.-M., & Randall, G. (Mar. 24, 2012). LSD: a Line Segment Detector. *Image Processing On Line*, 2, 35-55. doi: http://dx.doi.org/10.5201/ipol.2012.gjmr-lsd.
Von Gioi, R. G., Morel, J.-M., Randall, G., & Jakubowicz, J. (2008, 11 1). On Straight Line Segment Detection. Journal of Mathematical Imaging and Vision, 32(3), 313-347. doi:http://dx.doi.org/10.1007/sl0851-008-0102-5.
Xu, Y., Oh, S., & Hoogs, A. (2013). A Minimum Error Vanishing Point Detection Approach for Uncalibrated Monocular Images of Man-made Environments. *IEEE Conference on Computer Vision and Pattern Recognition*, (pp. 1376-1383). doi:http://doi.ieeecomputersociety.org/10.1109/CVPR.2013.181.
Zhang, Z. (Jul. 2004). Camera calibration with one-dimensional objects. *Pattern Analysis and Machine Intelligence, IEEE Transactions on*, 26(7), 892-899.
PCT/US2015/030919 International Search Report and Opinion on Patentability (Jul. 10, 2017) 20 pages.
Savransky et al. "Modeling and Rendering Eschar-Like Impossible Scenes"; Computer Graphics Forum, vol. 18, No. 2; Publication (online) 1999. Retrieved Jul. 30, 2015.

* cited by examiner

COLLABORATIVE DISPARITY DECOMPOSITION

CROSS REFERENCE TO RELATED APPLICATIONS

This application is a continuation of U.S. application Ser. No. 17/100,925 filed Nov. 22, 2020 to El Dokor et al., titled "Collaborative Display Composition", currently pending, which is a continuation of U.S. application Ser. No. 16/240,754 filed Jan. 6, 2019 to El Dokor, et al., titled "Collaborative Display Composition", now U.S. Pat. No. 10,846,844, which is a continuation of U.S. patent application Ser. No. 15/863,952 filed Jan. 7, 2018 to El Dokor et al., titled "Collaborative Disparity Decomposition", now U.S. Pat. No. 10,176,564, which is a continuation of U.S. patent application Ser. No. 14/628,278 filed Feb. 22, 2015 to El Dokor et al., titled "Orthogonal and Collaborative Disparity Decomposition", now U.S. Pat. No. 9,865,045, which in turn claims the benefit of U.S. Provisional Patent Application 61/994,963 filed May 18, 2014 to El Dokor et al., titled "Orthogonal and Collaborative Disparity Decomposition in Structured Manmade Environments", and U.S. Provisional Patent Application 62/054,398 filed Sep. 24, 2014 to El Dokor et al., titled "Orthogonal and Collaborative Disparity Decomposition", the entire contents of these applications being incorporated herein by reference.

BACKGROUND

One of the biggest challenges in computational stereo lies in having the capability to identify local and global constraints that can somehow be combined together effectively to construct a disparity map. Many techniques try to propagate knowledge from a global level and try to fit local constraints on that knowledge or belief.

For instance, Bleyer, Rother, & Kohli (*Surface Stereo with Soft Segmentation. S.I., IEEE* 2010) utilize color-based segmentation as well as local, within-segment constraints to produce solid disparity computations. Their approach is dependent inherently on good color-based segmentation, and would fail otherwise. Such an advantage is seldom available in real-world images, usually characterized by higher levels of noise and lower color fidelity than their idealized counterparts, usually rendered through still photography or under more controlled lighting environments.

Approaching disparity computation from coarse to fine scale (global to local) is not novel in itself. Examples include work done by (Zhao & Taubin, 2011), in which a multi-resolution approach to depth estimation is utilized. Major features are extracted at a coarser scale of a multi-scale pyramid. More details are extracted at finer scales.

It would therefore be beneficial to present a method and apparatus for overcoming the drawbacks of the prior art.

SUMMARY

10061 However, there is almost no work, with the exception of one or more pending applications of the current inventors, including U.S. application Ser. No. 13/025,038, filed Feb. 10, 2011 to El Dokor et al. titled Method and Apparatus for Performing Segmentation of an Image, now U.S. Pat. No. 8,655,093; Ser. No. 14/148,761, filed Jan. 7, 2014 to El Dokor et al. titled Apparatus and Method for Segmenting an Image; Ser. No. 13/025,055, filed Feb. 10, 2011 to El Dokor et al. titled Method and Apparatus for Disparity Computation in Stereo Images, now U.S. Pat. No. 8,582,866; Ser. No. 14/050,308 filed Oct. 19, 2013 to El Dokor et al. titled Apparatus and Method for Disparity Map Generation, now U.S. Pat. No. 8,798,358; Ser. No. 14/050,311, filed Oct. 9, 2013 to El Dokor et al. titled Apparatus and Method for Performing Segment-Based Disparity Decomposition; Ser. No. 13/025,070, filed Feb. 10, 2011 to El Dokor et al. titled Method and Apparatus for Determining Disparity of Texture, now U.S. Pat. No. 8,666,144; Ser. No. 14/160,592, filed Jan. 22, 2014 to El Dokor et al. titled Apparatus and Method for Determining Disparity of Textured Regions; Ser. No. 13/297,029, filed Nov. 15, 2011 to Cluster et al. titled Method and Apparatus for Fast Computational Stereo, now U.S. Pat. No. 8,705,877; Ser. No. 13/297,144, filed Nov. 15, 2011 to Cluster et al. titled Method and Apparatus for Fast Computational Stereo, now U.S. Pat. No. 8,761,509; Ser. No. 13/294,481 filed Nov. 11, 2011 to El Dokor et al. titled Method and Apparatus for Enhanced Stereo Vision; Ser. No. 13/316,606, filed Dec. 12, 2011 to El Dokor et al. titled Method and Apparatus for Fast Computational Stereo, now U.S. Pat. No. 8,718,387; and Ser. No. 14/226,858, filed Mar. 27, 2014 to El Dokor et al., titled Method and Apparatus for Enhancing Stereo Vision Through Image Segmentation, the contents of these applications and patents being incorporated here by reference in their entirety, that is available today to address the issues of real-time computational stereo and exploiting scene redundancy to reduce the computational cost that is usually associated with stereoscopic imaging and the reconstruction of depth maps from stereo. In one or more of the noted co-pending applications, the inventors presented the case for describing various types of segments, labeled as stable or unstable segments, used for developing a disparity map. This is accomplished by matching such segments with their appropriate counterparts between the two images in a stereo image sequence.

Building on the implementation that has been presented in the prior noted applications, the inventors of the current invention present a series of criteria for updating the various segments, specifically with the goal of efficient and accurate depth map updating. In accordance with the teachings of one or more of the co-pending applications, it is meaningful to look only at the changes that have been associated with a given stereo image sequence to produce a subsequent depth map and not look at the entire image. This is computationally more efficient. It is also more accurate for matching, since only regions with significant changes in them are being matched. In accordance with the current invention, the inventors present an additional embodiment related to the framework with which such an approach can be accomplished, defining various types of regions and segments that are associated with such an approach. In one or more of the co-pending applications the inventors of the current invention presented different types of segments and their relationship to scene organization. One or more of these features may be employed in accordance with one or more embodiments of the present invention.

Still other objects and advantages of the invention will in part be obvious and will in part be apparent from the specifications and drawings.

The invention accordingly comprises the several steps and the relation of one or more of such steps with respect to each of the others, and the apparatus embodying features of construction, combinations of elements and arrangement of parts that are adapted to affect such steps, all as exemplified in the following detailed disclosure, and the scope of the invention will be indicated in the claims.

DETAILED DESCRIPTION

Figure 1:
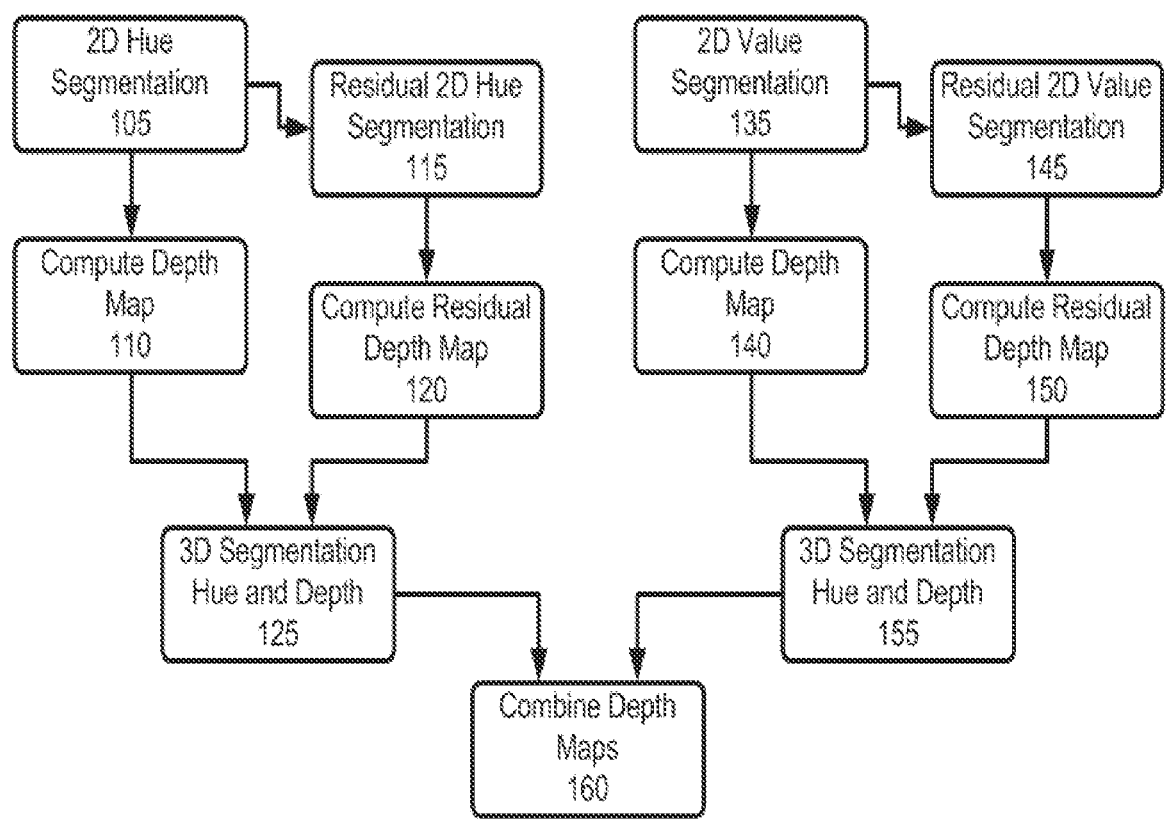
FIG. 1 is a flowchart diagram depicting an overview of a process of orthogonal decomposition of gray and color worlds in accordance with an embodiment of the invention.

The goal of orthogonal, collaborative decomposition is to simplify the complexity of disparity decomposition and generate a more accurate disparity estimate in real-time by extracting salient structural features in man-made and architectural environments. One such dominant set of features involves the extraction of parallel lines in a scene. Of course, this technique is equally applicable to naturally occurring or any other presented environment.

Orthogonal Stereoscopic Spaces

Because of the projection properties that are associated with a given camera angle, parallel lines may appear at slightly different angles when projected onto an image plane. This result of such projecting of images may be applied to an array of images instead of a single set of images. Thus, in accordance with one or more embodiments of the present invention, it is this disparity of angles between various images that may be exploited to aid in formation of a depth map.

The inventors of the current invention present below, a series of cases comprising one or more embodiments of the current invention in which an orthogonal set of complementary depth maps may be combined together, in a novel approach, to produce a composite depth map that is robust enough to be practical.

It is contemplated in accordance with the various embodiments of the invention that a stereo camera or distributed system may be employed that acquires images from at least two different vantage points may preferably be employed. These images are acquired (in accordance with various characteristics, as will be described below) and stored in an associated non-transitory computer-readable storage medium. Such medium may be located locally with the imaging cameras of the stereo camera system, or may be remotely located as cloud or other remote storage. A general purpose computer, or customized hardware processing system preferably analyzes and processes the acquired images as will be described below. It is further contemplated that such processor may be provided locally or remotely. Finally, an output portion of the stereo camera system may be provided for providing output information about imaged objects and the like as described below. While a specific hardware implementation has been described, any hardware setup having the requisite elements may be employed in accordance with the various embodiments of the invention.

Therefore, in accordance with one or more embodiments of the present invention, an initial depth map, D is preferably defined, such that an orthogonal complement, $D^\perp$, is part of an orthogonal or approximately orthogonal set of depth maps, defining complementary spaces. The set of all such spaces represents the decomposition of a given scene.

The inventors of the current invention have further determined that it is reasonable to assume that once the decomposition of a scene into such a set of spaces is successful, then the overall scene may be reconstructed through interpolation between the different orthogonal depth maps.

Example Approach—Orthogonal Decomposition in the Gray and Color World

In a first example, the inventors of the current invention present a case where an orthogonal decomposition preferably takes place in a color space. One or more color spaces may be combined together to produce a meaningful segmentation algorithm and depth computation algorithm. In accordance with this embodiment of the current invention, the inventors of the current invention present a novel approach to such a process, in which the scene is preferably broken into two orthogonal scenes: one of high chroma and the other of low chroma. Other orthogonal scenes may also be employed in accordance with one or more alternative embodiments of the invention. The two scenes are then preferably segmented, and the steps described above are preferably implemented so that the overall scene may be reconstructed through interpolation between the different orthogonal depth maps. The result is a more complete and comprehensive depth map.

In the color world, hue or similar representations of color remain the dominant feature for differentiating pixels. However, in a grayworld, intensity becomes a dominant feature. As a result, in accordance with an embodiment of the invention, the task of depth map computation is preferably divided into two tasks depending on the individual pixel's dominant feature: chromatic hue or achromatic intensity. Gradients of these features may also be extracted, as well as the scales that are associated with such gradients to be used in disparity decomposition. However, the fundamental approach remains unchanged from the inventive application in the color world, namely: performing grayworld segmentation and/or performing grayworld residual segmentation, computing depth on both, and then combining the results in an overall grayworld depth map.

Once the grayworld depth map has been created, it can be easily combined and fused with the high-Chroma depth map, described above. FIG. 1 represents an algorithm with the two processes running simultaneously. In one realization, data need not be shared between the two processes, but rather, the final result is combined to produce a composite depth map.

As is shown in FIG. 1, at step 105 a 2D hue segmentation (color world) is performed, and a depth map is computed therefrom at step 110. A residual 2D hue segmentation is performed (preferably in accordance with a separate image, acquired at a different time or by a different imager, or the like) at step 115. A residual depth map is computed therefrom at step 125. In a manner as described above, the depth map and residual depth maps are segmented and combined at step 125.

Similarly, in a grey world, at step 135 a 2D value segmentation (preferably intensity) is performed, and a depth map is computed therefrom at step 140. A residual 2D value segmentation is performed (preferably in accordance with a separate image, acquired at a different time or by a different imager, or the like) at step 145. A residual depth map is computed therefrom at step 150. In a manner as described above, the depth map and residual depth maps are segmented and combined at step 155. Finally, at step 160 the composite depth maps generated at steps 125 and 155 are combined.

Approximate Orthogonal Decomposition on Salient Features

In the previous embodiment of the invention, the inventors describe a case in which the dominant features were chromaticity and achromaticity. This approach, however, can be extended alternative embodiments of the invention to include any set of decompositions that is orthogonal and capable of producing differentiable features, leading to a depth map. Consider the projections of a scene onto multiple dimensions, where each projection is mutually exclusive. For each projection, disparity decomposition is attempted in a manner similar to what has been described above in accordance with one or more of the noted co-pending applications of the inventors with the exception that the search space is reduced to the domain of the projection. Further search-space reductions can be achieved and utilized as more approximately orthogonal features are exploited.

An initial set of disparity maps can be generated from the associated set of approximately orthogonal features. A composited disparity map may be extracted from the union as well as other combination of all the approximately orthogonal disparity maps. This is possible because all the features comprising the individual maps are approximately orthogonal.

Let $S_{L,R}(x,y)$ represent an image sequence comprised of left and right images, and define a disparity operator, D, comprising all of the steps described above or following to compute disparity. If the scene, $S_{L,R}(x, y)$, can be represented by a set of N orthogonal scenes, $O_{n_{R,L}}$ such that:

$$\{O_{1_{L,R}}(x,y) \perp O_{2_{L,R}}(x,y) \ldots \perp O_{N_{L,R}}(x,y) \subseteq S_{L,R}(x,y)\} \quad \text{Equation 1}$$

then $D\{S_{L,R}(x, y)\}$ can be represented by a set of orthogonal decompositions, such that:

$$\{D\{O_{1_{L,R}}(x,y)\} \perp D\{O_{2_{L,R}}(x,y)\} \ldots \perp D \\ \{O_{N_{L,R}}(x,y)\}\} \subseteq D\{S_{L,R}(x,y)\} \quad \text{Equation 2}$$

The union of all the disparity scenes then comprises the composite depth map, $\mathcal{D}$, such that:

$$\mathcal{D} = \cup_{n=1}^{N} D\{O_{n_{L,R}}(x,y)\} \quad \text{Equation 3}$$

Extension to Approximately Orthogonal and Fuzzy Sets

In many real-world scenarios it may not be possible to select features which are completely orthogonal. However, pixels which are described by approximately orthogonal features can either be assigned to a scene containing the most relevant information, or allowed membership in multiple decompositions simultaneously, where the "best" depth value is selected using a cost function which evaluates all applicable domains.

Let $\mu_n(x,y)$ define the degree of membership in fuzzy set $A_{n_{L,R}}$ such that:

$$\{A_{1_{L,R}}(x,y) \cap A_{2_{L,R}}(x,y) \ldots \cap A_{N_{L,R}}(x,y)\} \neq \emptyset \quad \text{Equation 4}$$

If $O_{n_{R,L}}$ is approximated by the subset of $A_{n_{L,R}}(x,y)$ with the maximum degree membership over all N decompositions:

$$\tilde{O}_{n_{R,L}} \subset A_{n_{L,R}} \left| \max_n \mu_n(x, y) \right. \quad \text{Equation 5}$$

Then the composite depth map remains defined as:

$$\mathcal{D} = \cup_{n=1}^{N} D\{\tilde{O}_{n_{L,R}}(x,y)\} \quad \text{Equation 6}$$

Otherwise, the depth map is defined by the union of decomposition with a minimum cost, C, at each pixel location.

$$\mathcal{D} = \bigcup_{n=1}^{N} = \min_n C\{D\{A_{n_{L,R}}(x, y)\}\} \quad \text{Equation 7}$$

GPU Implementation

Figure 2:
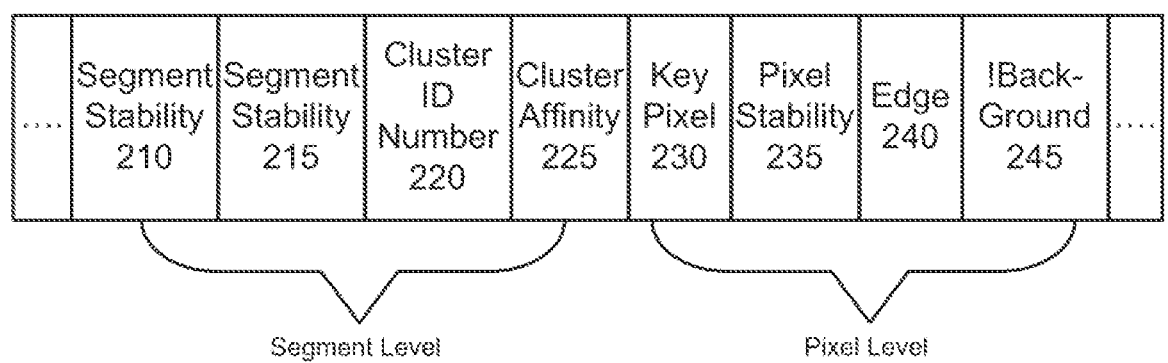
FIG. 2 is a block diagram depicting alpha encoded segment flags ensuring orthogonality between decomposition domains in accordance with an embodiment of the invention.

In the GPU implementation of residual segmentation, previously described in one or more of the above-referenced applications, two alpha-encoded segmentation flags are available to ensure orthogonality between decompositions, the edge flag and the "not-background" flag. FIG. 2 depicts alpha encoded segment flags that may be employed to ensure orthogonality between decomposition domains. As is shown in FIG. 2, two segment stability identifiers 210, 215 are first presented. Next, a cluster ID number 220 is presented indicative of a current cluster number to which the particular segment belongs. Cluster affinity 225 depicts whether the pixel is associated with a particular cluster in question. Key pixel element 230 defines a pixel within the segment that is representative of the entire segment, and is therefore employed for various processing steps. Pixel stability element 235 indicates a current stability status of the segment, as more completely described in the one or more applications incorporated herein by reference. Edge element 240 represents whether the segment comprises an edge of an object.

The not-background flag 245 identifies all pixels allowed to participate in segmentation, i.e. pixels which obtain a cluster number and become merge candidates for adjacent pixels, such that unmarked pixels are ignored. Conversely, the edge flag 240 identifies pixels which participate in segmentation but must observe additional boundary conditions. For example, edge pixels may only merge with similarly marked edge pixels and/or non-edge pixels may not merge across edge pixels.

In addition to the alpha channel flags, orthogonality can be enforced through the definition of the color metric used to merge spatially connected pixels. Consider two pixels, p(x, y) and p(x+i, y+j), spatially located within a window of size (I,J).

In the previous implementation, the pixels were considered connected if the absolute difference was less than a given threshold, T, for all applicable color channels.

$$|p(x, y) - p(x+i, y+j)| < \tau \qquad \text{Equation 8}$$

Where $$p(x, y) = \begin{bmatrix} r(x, y) \\ g(x, y) \\ b(x, y) \end{bmatrix} \text{ or } p(x, y) = \begin{bmatrix} h(x, y) \\ c(x, y) \\ v(x, y) \end{bmatrix}$$

For an orthogonal or approximately orthogonal color space, this metric can preferably be represented as:

$$\begin{bmatrix} |p_c(x, y) - p_c(x+i, y+j)| < \tau_c \\ p_{!c}(x, y) < \tau_{!c} \\ p_{!c}(x+1, y+j) < \tau_{!c} \end{bmatrix} \qquad \text{Equation 9}$$

Where the relevant color channel must pass the color metric and all remaining color channels should lack color information.

Application—Traffic Signals and Lane Lines

Figure 3:
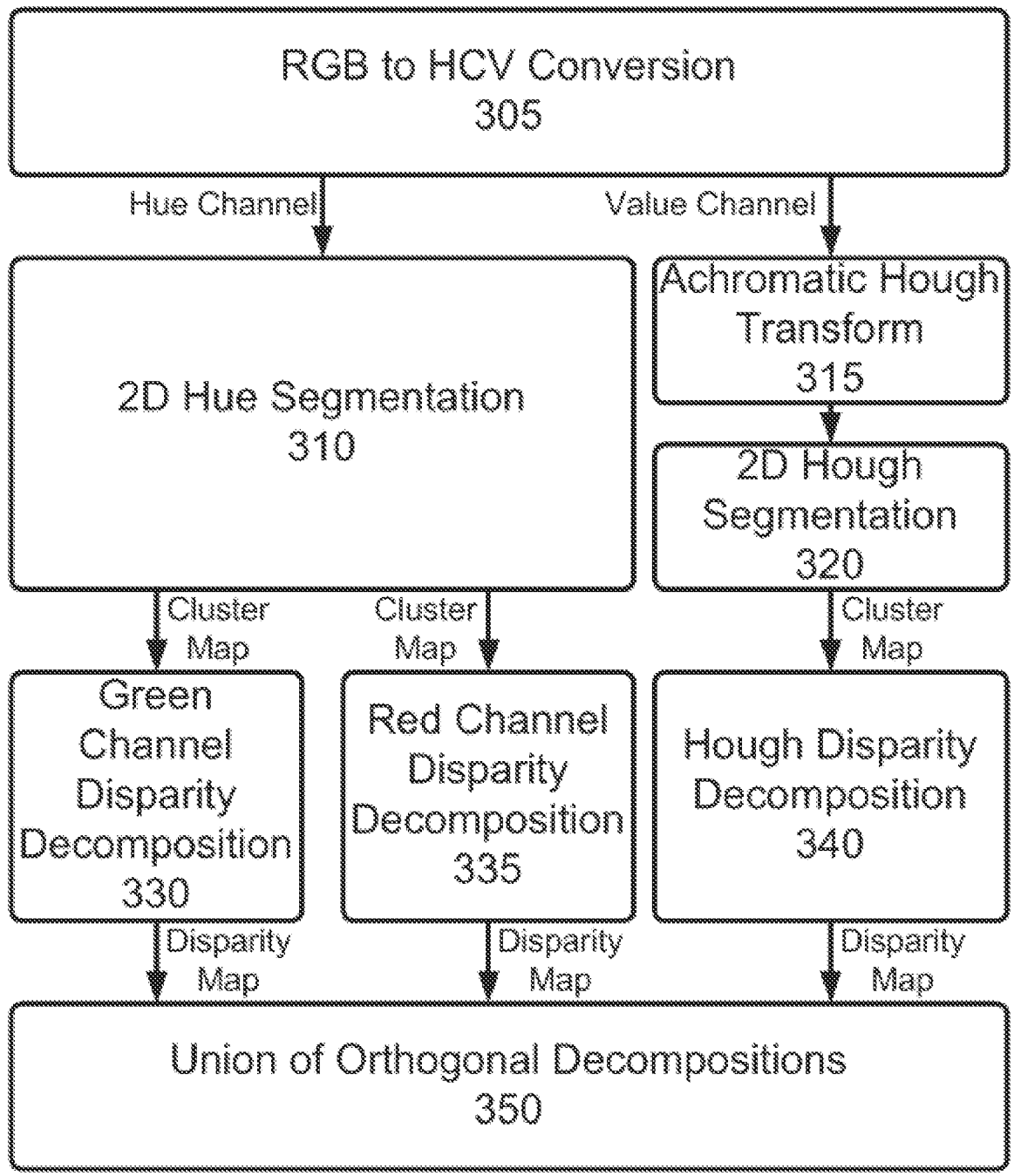
FIG. 3 is a block diagram depicting orthogonal disparity decomposition in red, green, and Hough domain spaces in accordance with an embodiment of the invention.

One example to which orthogonal disparity decomposition is well-suited is three-dimensional tracking of chromatic traffic signals and achromatic lane lines. In this case, the scene can be projected onto three orthogonal scenes/spaces describing, red traffic lights, green traffic lights, and Hough lines respectively. As shown in FIG. 3, the separation of the color domain into the opponent red and green channels need only occur before depth computation since segmentation can be used to project the scene into the different domains.

In FIG. 3, an RGB to HCV conversion process begins at step 305. 2D Hue Segmentation takes place at step 310 along a hue channel in order to process, for example, the red and green traffic lights, while along a value channel, an achromatic Hough transform is performed at step 315, and then a 2D Hough segmentation is performed at step 320 in order to process, for example, the achromatic traffic lane lines. Cluster maps are formed respectively for the green lights through a green channel disparity decomposition at step 330, for the red lights at a red channel disparity decomposition step 335, and for the lane lines at a Hough disparity decomposition step 340. Finally, at step 350 the union of the orthogonal decompositions are provided. While this process has been described with two colors and one achromatic analysis, an combination of orthogonal dimensions may be employed, including any number of colors and/or achromatic channels.

The composite depth map at step 350 is therefore given by the union of the Green channel, Red channel, and Hough domain orthogonal decompositions, such that:

$$\cup \{\mathcal{D}_i^H, \mathcal{D}_i^R, \mathcal{D}_i^G\} \qquad \text{Equation 10}$$

where $\mathcal{D}_i^H, \mathcal{D}_i^R, \mathcal{D}_i^G$ represent the green, red, and Hough-domain depth images respectively. Conceivably, all of these different decompositions are near-orthogonal, with very few features overlapping. This assumption is being loosely used since all three of the aforementioned domains may overlap. Therefore, the various embodiments of the present are preferably applicable to orthogonal, nearly orthogonal, or other domains differing by a sufficient amount in one or more directions or domains.

Stereoscopic Matching of Vanishing Points belonging to Orthogonal Spaces in Architectural Environments One application of the present invention is for man-made environments, although application to any environment is contemplated in accordance with the various embodiments of the invention. Most man-made environments (and many other naturally occurring or other environments) present structural representations that can be simplified with lines, circles, ellipses, and corners. Many human environments are comprised of lines, sets of parallel lines, corners, circles and ellipses. The inventors of the present invention have determined that it would be helpful for us to extract sets of parallel lines, as they are projected onto an image surface.

The inventors of the present invention have further determined that every vanishing point, corresponding to a set of parallel lines, may denote a scene orientation. Hence, a hallway, for example, comprised of two sets of parallel lines, all converging onto the same vanishing point, potentially offers a very accurate set of left and right images for reconstruction of more than just what is visible in the scene.

The inventors of the present invention have further determined that the three principle axes that comprise a room may therefore be defined by the identification of the three vanishing points of that room. Hence room corners may be reconstructed from left and right images, even though the corners may be occluded in the field-of-view in accordance with an embodiment of the invention.

Intra-Frame Detection of Vanishing Points on a Mobile Device

The inventors of the present invention therefore present here an embodiment of the invention where multiple parallel lines are tracked across frames.

Define lines. Upon imaging of a scene by a mobile device or other imaging device or system, one or more lines are preferably first defined by rho, theta, and mobile or other device parameters.

Intra-frame vanishing points. It has been determined that it is possible to track the vanishing points across multiple frames, by tracking parallel lines across these frames. In accordance with one or more embodiments of the present invention, the one or more vanishing points associated with one or more of the determined parallel lines may be tracked as the mobile or other device is moved around, or one or more objects in the image is moved relative to the mobile or other imaging device.

Any combination of parallel lines may preferably be represented by a single virtual vanishing point. For instance, a hallway may be represented by a single vanishing point, assuming a good image of the hallway is generated. Subsequent matching of the vanishing point of all the parallel lines comprising a hallway can help reconstruct depth on any point in any of the vanishing lines.

In a given multiview scene, in accordance with an embodiment of the invention, it may be preferable to define a group of parallel lines, $l_1, l_2, \ldots, l_n \in P_i$ where $i \in \{1, \ldots, k\}$ such that k is the total number of vanishing points in a scene, and $l_1 \cap l_2 \cap \ldots \cap l_n \approx P_i$, approximately intersecting at the same vanishing point. One may also assume that, in a second view, another group of parallel lines may converge upon a similar approximately intersecting set, with a single vanishing point for parallel lines. Note that in practical applications, approximately parallel lines may converge upon more than one vanishing point. Matching the vanishing points of the left and right images of a hallway preferably allows definition of a very specific reconstruction of such a hallway. Tracking such vanishing points across frames allows for the tracking of only changes in the images, instead of the entire image, thus substantially reducing processing requirements and improving processing speed.
Application—3D Generation of a Box from Two-Viewpoint Orthogonal Vanishing Points on a Mobile Platform Understanding and interpreting most man-made environments can be significantly enhanced by understanding the underlying structure that defines such environments.

Positioning/status of vanishing points in such an environment may preferably be grouped into three cases. The three cases of the vanishing points are defined as follows.

Figure 4:
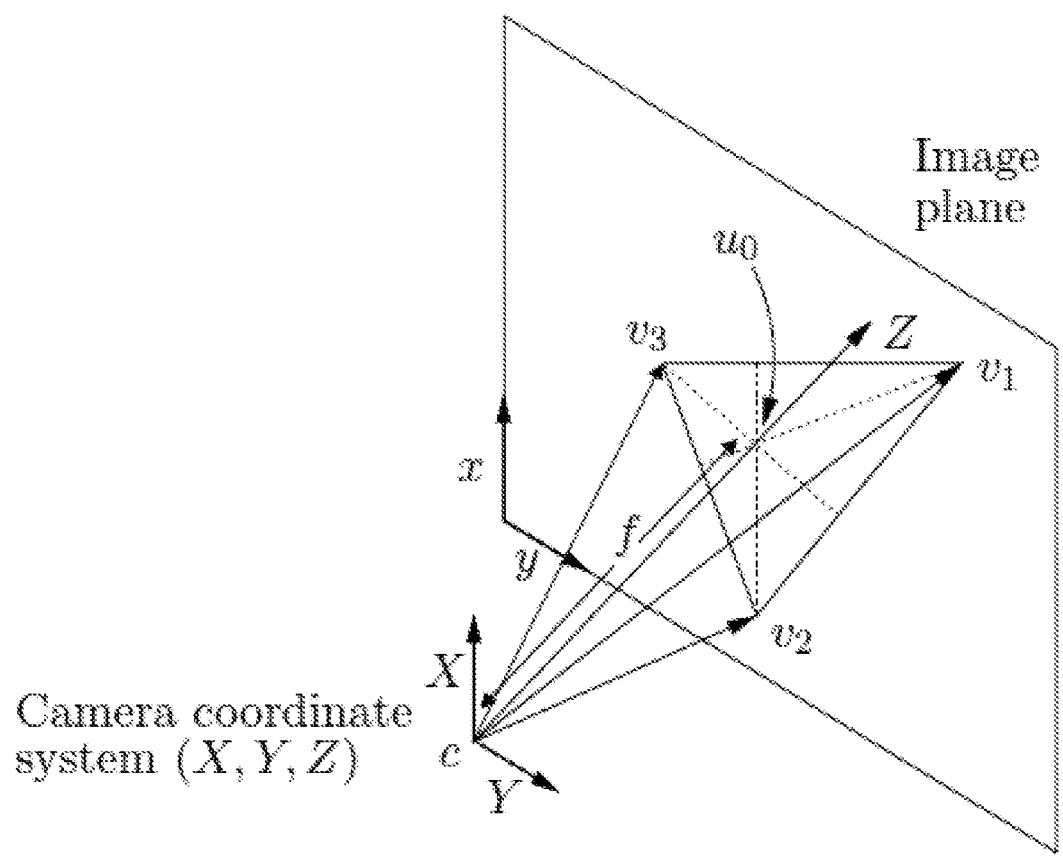
FIG. 4 depicts an orthocentric system comprised of three finite vanishing points in accordance with an embodiment of the invention.

I. Three finite vanishing points. In this case, an orthocentric system is preferably defined, see FIG. 4. The corners of the box may be drawn from the intersection of the three vanishing points, by connecting through the computed lines, the intersections of the various lines drawn from the vanishing points, see FIG. 5 (described below). Once the box corners are known, in accordance with this embodiment of the invention, it is possible to reconstruct the inside of the box through interpolation.

II. Two finite vanishing points. In this case, two finite vanishing points and one infinite vanishing point are present. In this case, the direction of the infinite vanishing point is orthogonal to the line defined by the finite vanishing point. A box may be reconstructed in accordance with this embodiment of the invention in each frame by matching the identified lines and intersecting such lines with the lines from the finite vanishing point.

III. One finite vanishing point. In this case, one finite vanishing point and two infinite vanishing points are present. A box that is subtended by these vanishing points may be reconstructed in accordance with this embodiment of the invention by using the finite vanishing point's defining lines, as well as the two sets of parallel lines that define the two infinite vanishing points respectively.

Matching Vanishing Points and their Associated Lines Between Different Views

A direct outcome of gleaning structure in man-made environments is the ability to match between vanishing points of different views. By understanding the structure that is associated with different viewpoints, it is possible to extract meaningful correspondences, and then extract subpixel accuracy from such correspondences, using the vanishing points and following through with the lines whose intersections comprise such vanishing points.

Let $l_1 \cap l_2 \cap \ldots, \cap l_n \approx P_{l_i}$, where $P_{l_i}$ is a left view vanishing point, and let $r_1 \cap r_2 \cap \ldots, \cap r_n \approx P_{r_i}$ where $P_{r_i}$ is a right vanishing point. Then the correspondence between the two vanishing points can be defined as a disparity measure $D_i(P_{l_i}, P_{r_i})$, where D is the disparity operator relating the two viewpoints together and to real-world coordinates. This approach can be extended to incorporate more viewpoints. With more viewpoints, the accuracy is also enhanced.

Practical Implications of Vanishing Points Matching

It is important to take into account the fact that these lines (as described above) should converge onto a single point. In some instances, however, due to practical implications these intersection points are not necessarily coincident. Instead they define intersections of near-parallel lines due to a number of inaccuracies, including lines, resolution, image acquisition etc. Hence, more than one intersection may represent a single vanishing point, and such intersections need to be combined together. The approach that may be simplest to look for is a nearest-neighbor clustering approach between these intersections, to reduce them to one intersection. Some intersections that are too far to cluster together may be indicative of a parallel lines set that may, in fact, not belong to the same set. Hence, although the assumption is that parallel lines vanishing in the same direction will possess a singular and unique associated vanishing point, practically speaking, the true convergence will occur at multiple vanishing points and will require logic be placed to integrate information from these different vanishing points.

Dimensioning a Hallway or Narrow Passageway

One application for depth reconstruction through the concept of the identification of vanishing points in accordance with an embodiment of the invention is the 3D capture of a hallway inside a home or office. To accomplish this, a hallway is first defined in each viewpoint through identifying a series of parallel lines that define the hallway. The vanishing point or points are then computed and then reduced into a singular estimated vanishing point, such that the singular vanishing point is in the direction of the hallway in a manner as described above in accordance with one or more embodiments of the present invention. Once the vanishing point is identified in two or more viewpoints, then the associated disparity-based multi-view matching is attempted.

This is very powerful because one can then estimate depth even outside the resolution of the system. This is done by extrapolating from the matched parallel lines across multiple views, allowing extraction of depth information at resolutions that are outside the field-of-view. So, for instance, if two parallel lines are matched, along with their vanishing points, then it is straightforward process to estimate where the vanishing point is located in space. This is matched across the two views, and so, a good estimate of measurements can also be accomplished. This is extremely helpful in scoping and dimensioning man-made environments, such as hallways and rooms.

Since the lines that are disappearing at the same vanishing points associated with hallways define a unique direction, it is easier to identify correspondences between left and right views that are associated with the respective vanishing points first, and then find the respective field-of-view points of interest, along the direction of the lines defining a particular vanishing point.

Finally, the process of interpolating between individual correspondence points becomes trivial. Given that we would now possess complete knowledge of the scene, that knowledge defines a subpixel accuracy level through interpolation. The easiest way to extract such knowledge is to generate a higher resolution set of images, upon matching the vanishing points, in both views, and then conducting disparity matching and interpolation along the parallel lines defining the vanishing point in both views. This allows for resolving a major issue with disparity-based matching: disparity resolution falls logarithmically with distance. The easiest solution is to commit to super resolving distance-based objects and introduce multi-scale. Once the distance-based objects are super-resolved, more pixels can then be used to more accurately to resolve depth at greater distances.

Extending dimensioning of a hallway into an entire room requires mosaicing or stitching of images together to produce a coherent depth map. Through mosaicking, we can walk through a house or room and dimension entire rooms or hallways.

Interactive Reconstruction of Structured Objects and Environments

The underlying principles for three-dimension reconstruction of hallway can be extended to address any structured object, be it a room or a simple box.

Once the vanishing points of objects in a scene are identified and matched across multiple views, then every pixel along any of the lines defined by a vanishing point may be reconstructed in three dimensions. This is true since objects with structure are often comprised of parallel lines that define vanishing points. Exploiting the existence of such structures allows us to find all of the vanishing points, then match them, and then reconstruct depth, based on a combination of disparity matching and vanishing point characteristics.

Computing Dimensions of Cuboid Objects

Cuboid objects are one such set of structured objects, comprised of objects with parallel lines, and associated vanishing point. Below, we summarize the steps that are required to converge upon accurate measurements of structured cuboid objects.

Figure 5:
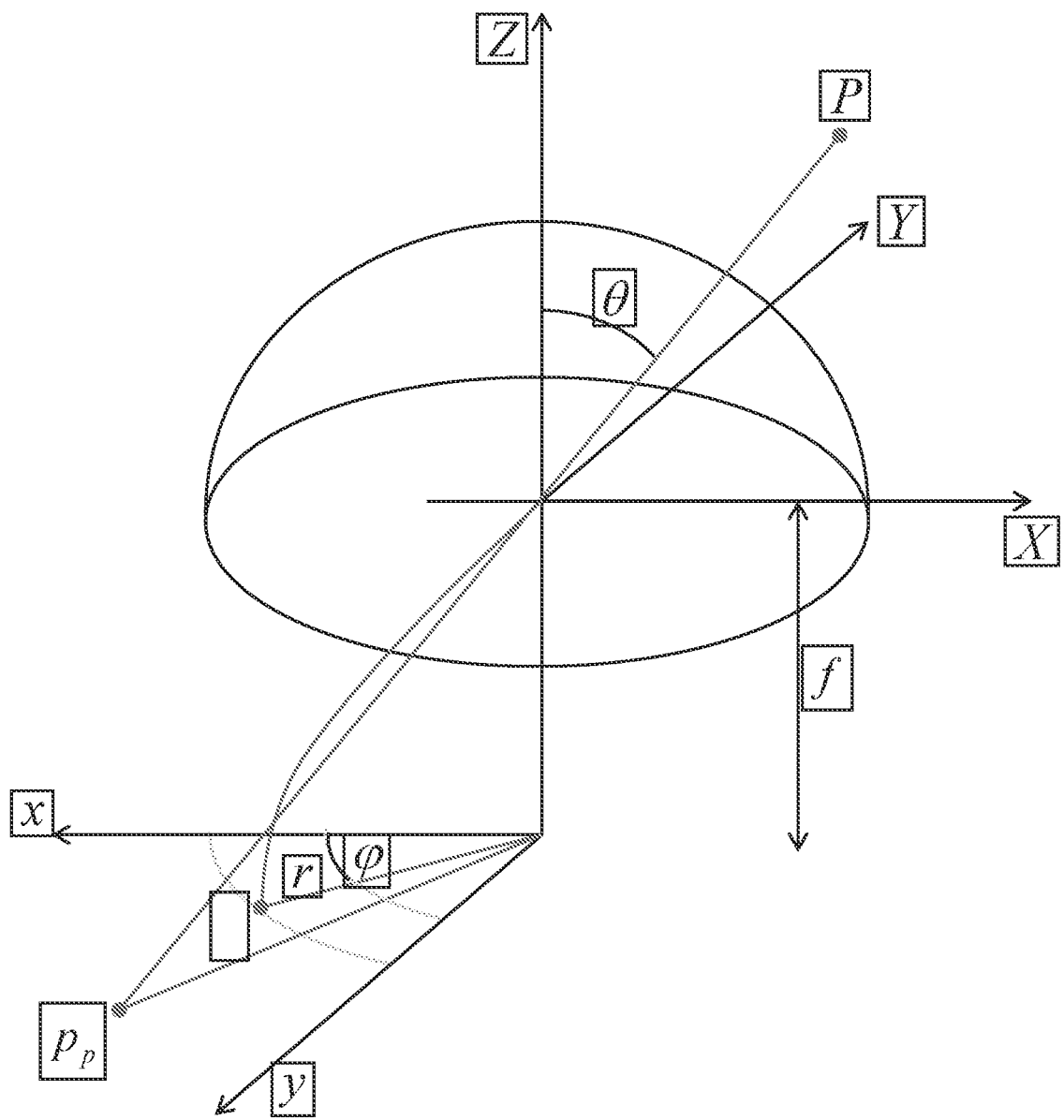
FIG. 5 depicts an image of a three-dimensional point, Pin accordance with an embodiment of the invention.

As shown in FIG. 5, a camera model, P, encapsulates the relationship between the world coordinates of a point, $P=(X,Y,Z)^T$, the direction of the incoming ray, $\Phi=(\theta,\varphi)^T$, and the image point $p=(x,y)^T$ where r is the distance between the image point and the principle point, $c=(u_0,v_0)^T$, $\varphi$ is the angle between the image point and the x axis, and $\theta$ is the angle between the optical axis and the incoming ray.

From FIG. 5, r is given by the Euclidean distance:

$$r=\sqrt{x^2+y^2} \qquad \text{Equation 11}$$

While $\varphi$ is given by the arctangent of the x and y coordinates:

$$\varphi = a\tan\left(\frac{y}{x}\right) \qquad \text{Equation 12}$$

However, r is further described as a function of theta by the camera projection model. For a pinhole camera, r is given by the perspective projection:

$$r(\theta)=f\tan\theta \qquad \text{Equation 13}$$

For a fisheye camera, r can be given by the equidistant, stereographic, orthogonal, or equisolid projection:

$$r(\theta)=f\theta \qquad \text{Equation 14}$$

$$r(\theta)=2f\tan(\theta/2) \qquad \text{Equation 15}$$

$$r(\theta)=f\sin\theta \qquad \text{Equation 16}$$

$$r(\theta)=2f\sin(\theta/2) \qquad \text{Equation 17}$$

Where f is the focal length of the lens scaled by the resolution of the sensor in pixels per unit distance.

Accordingly, if the distance D, from the world origin to the point P is known, the world coordinates can be computed:

$$X=D\sin\theta\cos\varphi$$

$$Y=D\sin\theta\sin\varphi$$

$$Z=D\cos\theta \qquad \text{Equation 18}$$

The length, L, width, W, or height, H, of an object in world coordinates can then be computed from any two points coinciding with a relevant vertex, $P_1$ and $P_2$:

$$\{L,W,H\}=\sqrt{(X_1-X_2)^2+(Y_1-Y_2)^2+(Z_1-Z_2)^2} \qquad \text{Equation 19}$$

Dimensioning a Cuboid Object

Parallel lines comprising a cuboid object, such as a FedEx® or UPS® package may first be extracted. This may be performed interactively, or may be performed automatically, by detecting the series of parallel lines in all three dimensions. This has been highlighted in 5, where lines are defined by the distance from the origin, rho and the associated angle, theta, where the two aforementioned parameters define a unique line. To maximize the number of lines, it may be preferable to choose an oblique view so that we have a total of nine lines (three per dimension).

Figure 6:
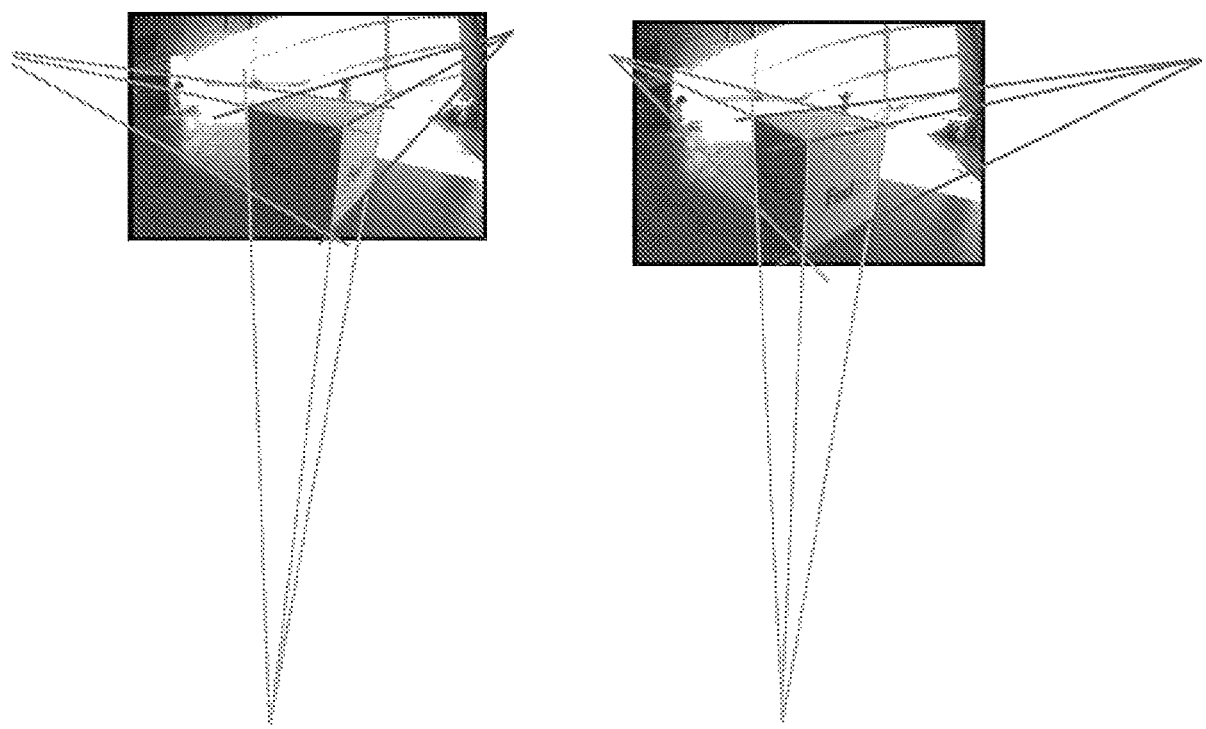
FIG. 6 depicts two different perspectives on a box's reconstruction from vanishing points in accordance with an embodiment of the invention.

Vanishing points from each set of parallel lines are then preferably obtained and matched, as is shown in FIG. 6.

Once the vanishing points are identified, reconstruction may be accomplished as has been described above, whereby accurate measurements may be obtained once the parallel lines have been matched between multiple views.

Exploitation of Cuboid Objects Through Orthographic Projection

Figure 8:
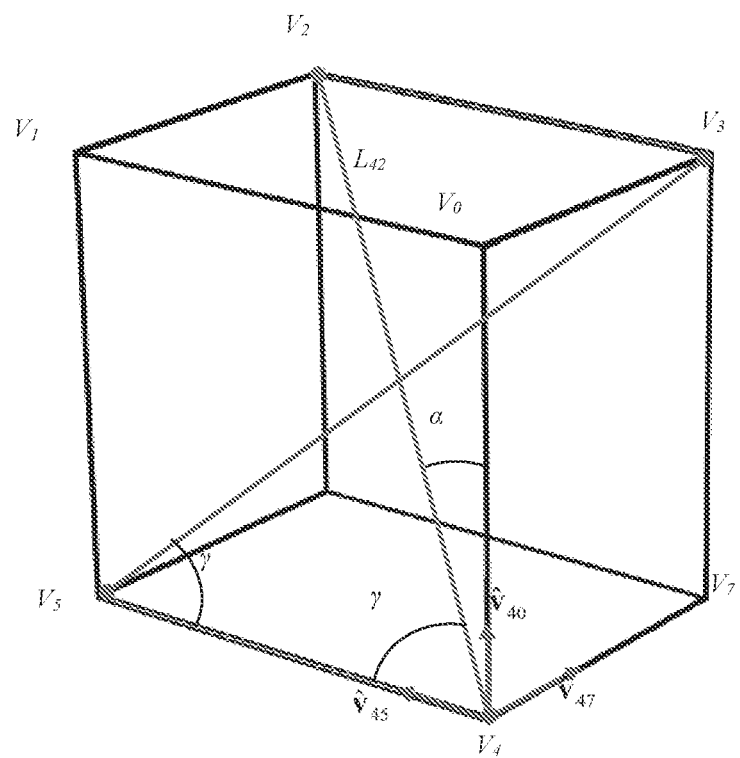
FIG. 8 is an overview of cuboid object and the associated diagonals and their associated vertices in accordance with an embodiment of the invention.

A cuboid is characterized with 90-degree angles between all of its sides at any given corner, i.e. any two sides produce a 90-degree angle. Also, having two views of the box allows us to exploit 3D extraction features of relevant box vertices, as has been described previously in one or more of the above-noted patent or patent applications incorporated herein by reference. This knowledge of shape can further simplify the process of dimensioning a box. The inventors of the present invention therefore posit that a unique box is defined by two vertices across the box's diagonal and the associated lines (tracing the corners) defining the vertices. In fact, there is no need to view the entire box, and there is not even a need to even view the vertices, if the lines defining such vertices are being traced correctly. Note that every corner of the cube is defined by three orthogonal lines. By orthographically projecting the corner and the associated lines defining the corner back to the origin, and then exploiting the orthogonality relationships between the three lines defining the corner, one can then extract the z-component of each of the lines. Finally, exploiting multiple views, it is possible to define the vector $\overline{V4V2}$ uniquely in 3D. In three dimensions, define a vertex, V2, at which two orthogonal lines intersect, and V4 (see FIG. 8) at which three orthogonal lines intersect—it is then possible to transform the three orthogonal lines at the vertex through perspective projection, back to the image center, such that the transformed observation represents the orthographic projection of the 3D cuboid onto the image plane.

Orthographic projection preserves the 3D relationship between these lines on the projected space, while allowing us to view the object in a profiled manner on the x-y plane. After orthographic projection, the x-y observed relationships in the image, i.e. the subtended angles between the three lines at the vertex V4, comprise the x-y components of the three orthogonal lines and these are rendered from the original image observation. One is left with defining the z-component associated with such lines to completed reconstruct in three dimensions the lines equations.

Under perspective projection, the extent of the perspective distortion varies with respect to distance from the camera. Accordingly, line orientation and angle measurements require depth estimation in order to dimension an object in 3D. Under orthographic projection, however, the image is geometrically homogenous and the interpretation of 3D line orientation does not involve depth. Thus, if given a vertex can be rotated to the canonical position (origin) where the distinction between perspective and orthographic disappears, angle measurements can be applied directly to box dimensioning.

Figure 9:
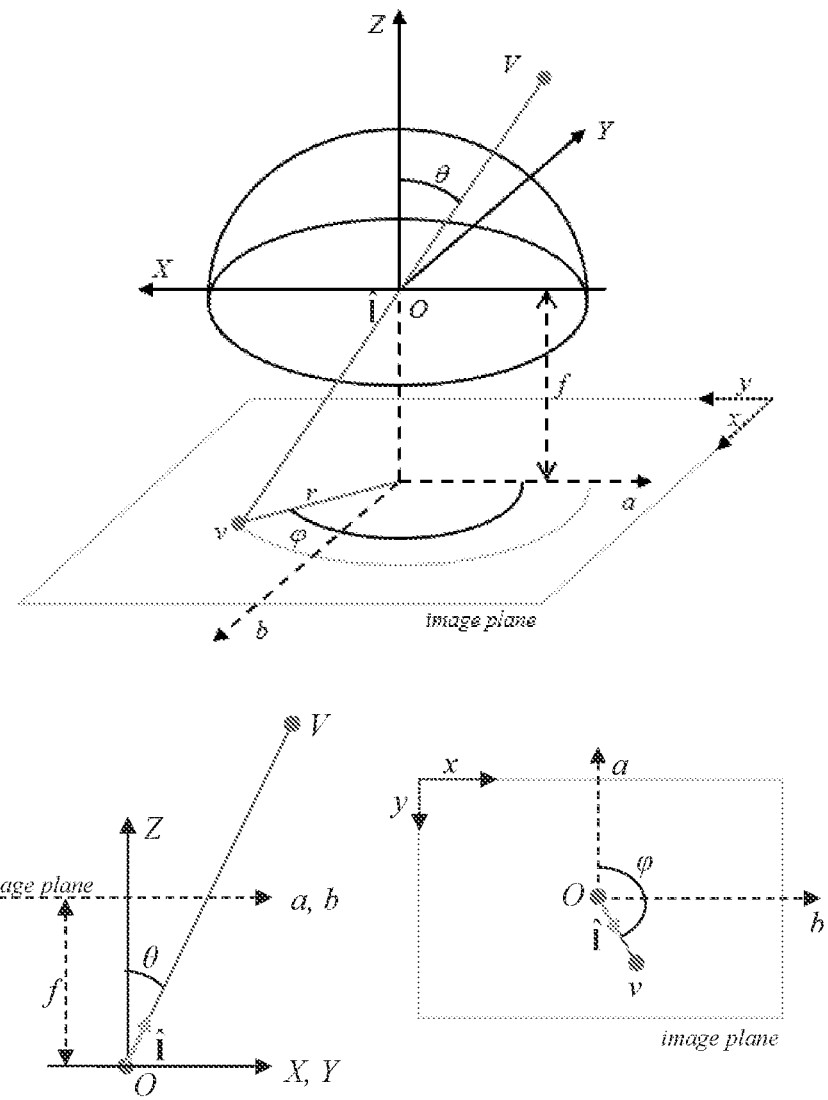
FIG. 9 is a depiction of 2D and 3D Coordinate Systems and their relationships in accordance with an embodiment of the invention.

As shown in FIG. 9, let the coordinates of the V2 and V4 vertices be given in 2D and 3D by:

$$v_i = [x, y]^T$$

$$V_i = [X, Y, Z]^T \qquad \text{Equation 20}$$

And assume 2D line equations defining the vectors $\hat{v}_{47}$, $\hat{v}_{40}$, and $\hat{v}_{45}$ are known.

As is further shown in 9, define φ as the angle formed with the a-axis, measured in a clockwise direction toward the b-axis, where a and b describe the pixel location on the image plane relative to the optical axis. Assuming the image centroid coincides with the optical center, the relationship with the xy pixel coordinates and ab image coordinates is defined as:

$$a = sH_p\left(\frac{sH}{2} - y\right) \qquad \text{Equation 21}$$

$$b = sW_p\left(x - \frac{sH}{2}\right)$$

Where s describes the ratio of up or down sampling. $W_p$ and $H_p$ describe the width and height of the pixel, W and H describe the number of pixels on the image plane.

Similarly, define a unit vector $\hat{l}$ connecting the camera origin to the location of vertex $v_4$ on the image plane:

$$\hat{l} = \left\langle \frac{a}{\sqrt{a^2 + b^2 + f^2}}, \frac{b}{\sqrt{a^2 + b^2 + f^2}}, \frac{f}{\sqrt{a^2 + b^2 + f^2}} \right\rangle = \langle l_a, l_b, l_f \rangle \qquad \text{Equation 22}$$

Where the angle between the Z-axis and the line $\hat{l}$ is given:

$$\theta = \tan^{-1}\left(\frac{\sqrt{a^2 + b^2}}{f}\right) \qquad \text{Equation 23}$$

And the unit vector normal to both the Z-axis ($\hat{k}$) and the $\hat{l}$ vector is given:

$$\hat{n} = \frac{\hat{k} \times \hat{l}}{\|\hat{k} \times \hat{l}\|} \qquad \text{Equation 24}$$

The location of $v_4$ on the image plane can be mapped to the origin (canonical position) by rotating the camera screwwise by the angle θ around the unit normal, $\hat{n}$, where the rotation matrix is given:

$$E \equiv \frac{a^2 l_f + b^2}{a^2 + b^2} \qquad \text{Equation 25}$$

$$F \equiv \frac{ab(l_f - 1)}{a^2 + b^2}$$

$$G \equiv \frac{b^2 l_f + a^2}{a^2 + b^2}$$

$$R(a, b) = \begin{bmatrix} E & F & l_a \\ F & G & l_b \\ -l_a & -l_b & l_f \end{bmatrix}$$

And the transformation induced on the φ angles is:

$$\overline{\varphi}_{ij} = \tan^{-1}\frac{(fE + al_a)\tan\varphi_{ij} - (fF + bl_a)}{(fF + al_b)\tan\varphi_{ij} - (fG + bl_b)} \qquad \text{Equation 26}$$

Using the rectangularity constraint, i.e. the assumption the lines $\hat{v}_{47}$, $\hat{v}_{40}$, and $\hat{v}_{45}$ are orthogonal in the 3D coordinate system, the angle $\overline{\theta}$ with the rotated Z-axis for each of the three lines is defined:

$$\overline{\theta}_{47} = \tan^{-1}\sqrt{\frac{-\cos(\overline{\varphi}_{40} - \overline{\varphi}_{45})}{\cos(\overline{\varphi}_{47} - \overline{\varphi}_{40}) - \cos(\overline{\varphi}_{45} - \overline{\varphi}_{47})}} \qquad \text{Equation 27}$$

$$\overline{\theta}_{40} = \tan^{-1}\sqrt{\frac{-\cos(\overline{\varphi}_{45} - \overline{\varphi}_{47})}{\cos(\overline{\varphi}_{40} - \overline{\varphi}_{45}) - \cos(\overline{\varphi}_{47} - \overline{\varphi}_{40})}}$$

$$\overline{\theta}_{45} = \tan^{-1}\sqrt{\frac{-\cos(\overline{\varphi}_{47} - \overline{\varphi}_{40})}{\cos(\overline{\varphi}_{45} - \overline{\varphi}_{47}) - \cos(\overline{\varphi}_{40} - \overline{\varphi}_{45})}}$$

And unit vectors describing lines in 3D are given as:

$$\hat{n}_{ij} = \langle \sin\overline{\theta}_{ij}\cos\overline{\varphi}_{ij}, \sin\overline{\theta}_{ij}\sin\overline{\varphi}_{ij}, \cos\overline{\theta}_{ij} \rangle \qquad \text{Equation 28}$$

Using the 3D coordinates of the vertices $V_2$ and $V_4$, a unit vector describing the box diagonal is defined:

$$L_{42} = \sqrt{(X_2 - X_4)^2 + (Y_2 - Y_4)^2 + (Z_2 - Z_4)^2} \qquad \text{Equation 29}$$

$$\hat{v}_{42} = \left\langle \frac{X_2 - X_4}{L_{42}}, \frac{Y_2 - Y_4}{L_{42}}, \frac{Z_2 - Z_4}{L_{42}} \right\rangle$$

Where the angle with the Z-axis is computed:

$$\theta_{42} = \cos^{-1}(\hat{v}_{42} \cdot \hat{k}) \qquad \text{Equation 30}$$

Accounting for the rotation of the Z-axis, when the vertex $v_4$ was moved to the origin:

$$\overline{\theta}_{42} = \theta_{42} + \cos^{-1}(R\hat{k} \cdot \hat{k}) \qquad \text{Equation 31}$$

After defining the unit vector $\hat{n}_{42}$ in the canonical position (Equation 28), the angle between the box diagonal and the vector $\hat{n}_{40}$ describing the box height is taken from the arcos of dot product:

$$\alpha = \cos^{-1}(\hat{n}_{42} \cdot \hat{n}_{40}) \qquad \text{Equation 32}$$

And the box height can be computed:

$$B_h = L_{42}\cos\alpha \qquad \text{Equation 33}$$

Similarly, the angle between the box diagonal and the vector $\hat{n}_{45}$ describing the box width is given:

$$\gamma = \cos^{-1}(\hat{n}_{42} \cdot \hat{n}_{45}) \qquad \text{Equation 34}$$

Since the box diagonal $L_{53}$ is identical to $L_{42}$, an isosceles triangle can be formed using the box diagonals and comprising the points V4, V5, and C. Then by the law of sines, one can write:

$$\frac{\sin \gamma}{1/2 L_{42}} = \frac{\sin \pi - 2\gamma}{B_w} \qquad \text{Equation 35}$$

$$B_w = \frac{1/2 L_{42} \sin \pi - 2\gamma}{\sin \gamma}$$

And from the Pythagorean Theorem, it can be concluded:

$$B_1^2 = L_{42}^2 - B_h^2 - B_w^2 \qquad \text{Equation 36}$$

Defining a unique cuboid: Starting from the x-y relationships defined above, one can then look at the relationship V2V4, defined in 3D, in FIG. 8, through stereoscopic calibration. Note that V2V4 is already defined in three dimensions through the set of equations, defined earlier in Equation 18. Given the (x,y,z) locations of each of V2 and V4, once can then extract the 3D vector from V4 to V2 and define the angle between V4V2 and V4V0. It is observed that the magnitude of the vector V4V2, and the angle defined by V4V0, as well as the lines intersecting to define V4 and V2, combined, are sufficient to define a unique cuboid or rectangular object. Hence, we can extract the 3D equations of the lines that define V4, including the line V4V0, and then use that information to find the angle. Once the angle has been obtained, it becomes a trivial task to extract knowledge of the rest of the box's dimensions through trigonometric relationships, as has been defined above.

Figure 10A:
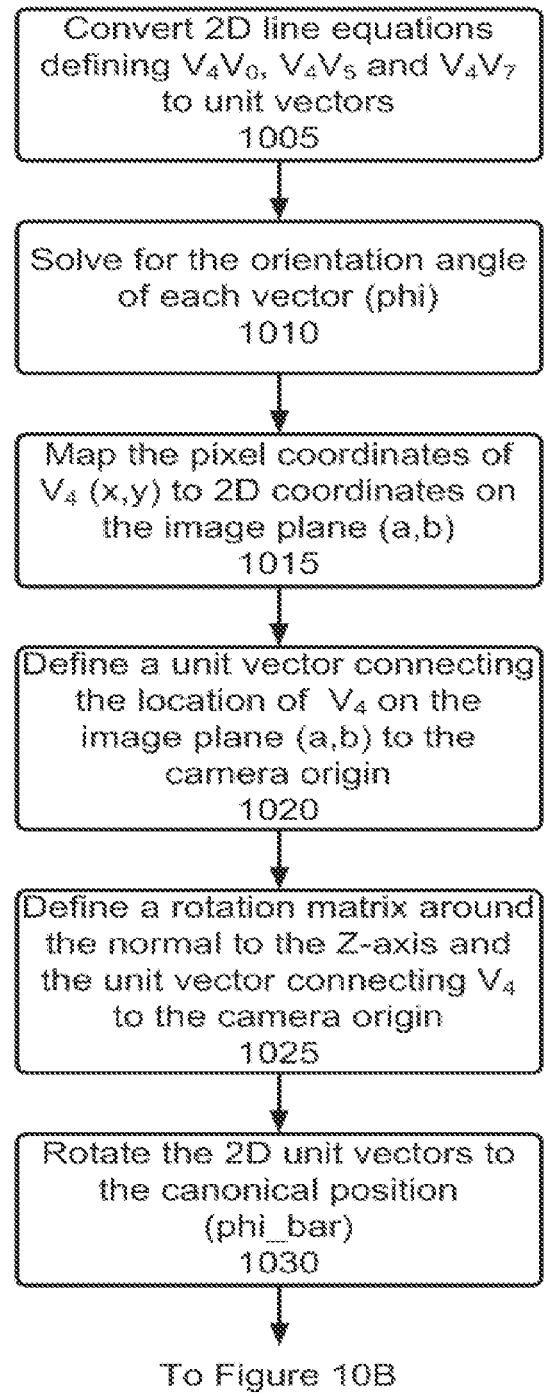
FIGS. 10A, 10B and 10C comprise a flowchart diagram depicting a process whereby a cuboid object's orthogonality relationships are exploited to extract dimension information of the cuboid in accordance with an embodiment of the invention.
Figure 10B:
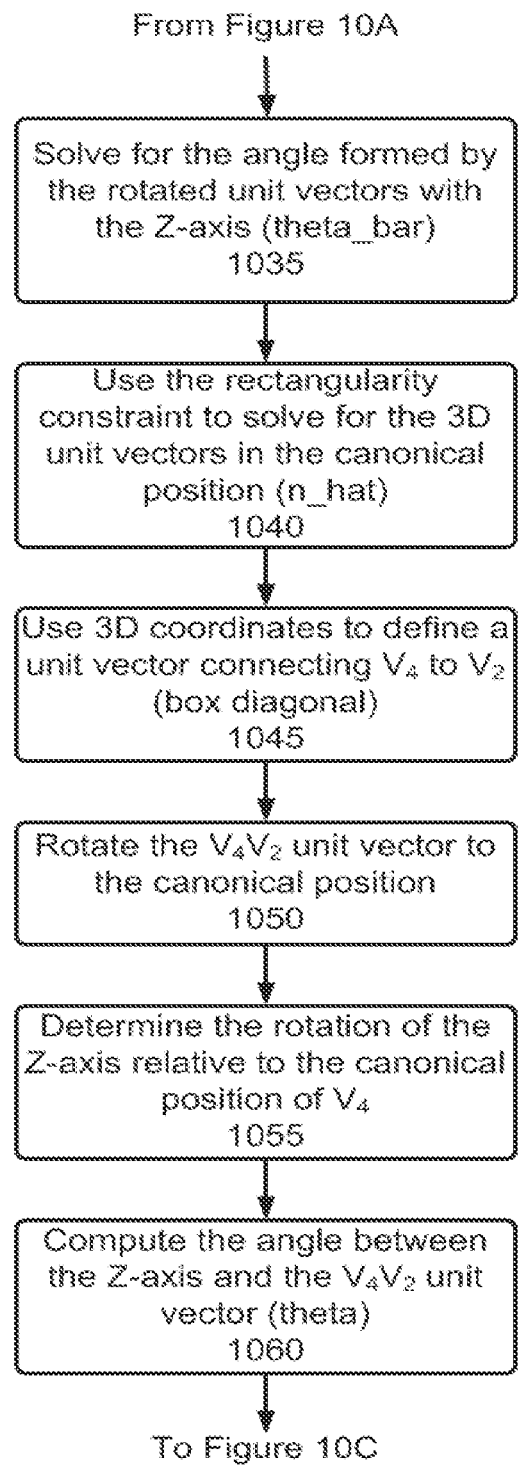
Figure 10C:
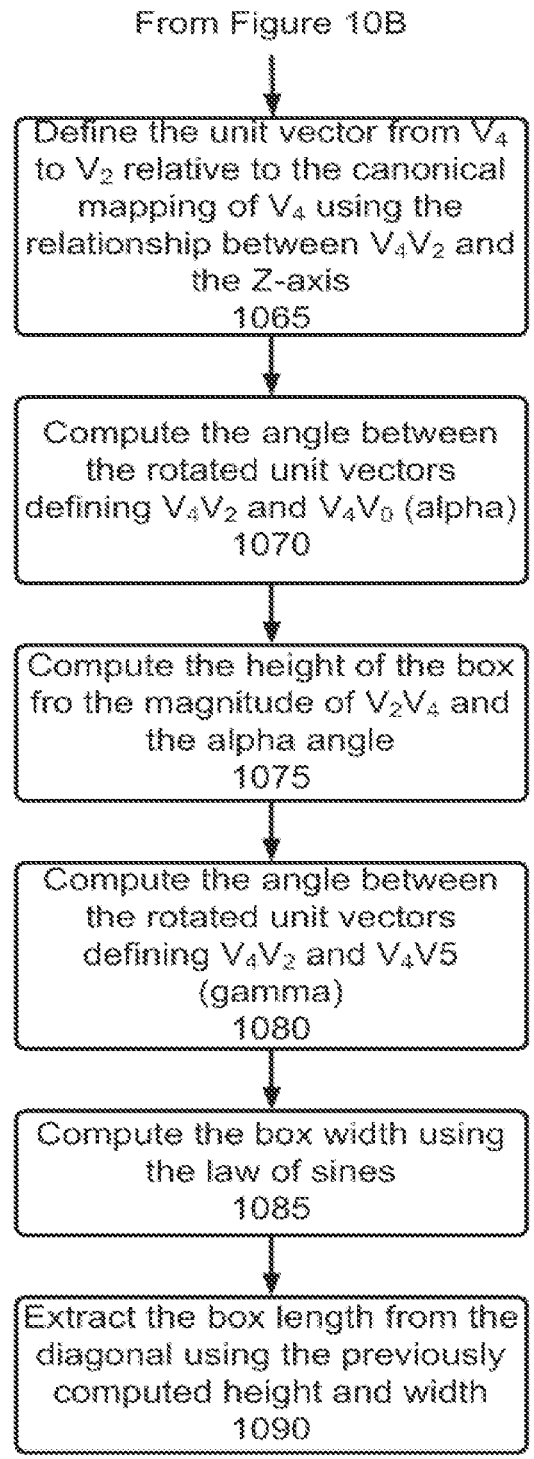

A flowchart of the overall approach that has been described in this section is presented in FIGS. 10A, 10B and 10C (FIG. 10). As is shown in FIG. 10, at step 1005 unit vectors are first extracted from the 2D line equations. The orientation angle at each unit vector is then extracted at step 1010. A rotation is then attempted of V4 back to the system origin (the canonical position), where the pixel coordinates are mapped back to the image plane at step 1015, a unit vector connecting the location of V4 on the image plane to the camera origin is defined at step 1020, a rotation matrix around the normal to the Z-axis and the unit vector connecting V4 to the camera origin at step 1025, and the 2D unit vectors are rotated to the canonical position (phi_bar) at step 1030. The z-component is then solved by solving for the angle formed by the rotated unit vectors with the Z-axis (theta_bar) at step 135, and then using the rectangularity constraint, the 3D unit vectors in the canonical position (N_hat) are solved at step 1040. The vector $\overline{V4V2}$ (box diagonal) is defined at step 1045, and is then extracted in three dimensions, using multiple views, and also rotated over to the canonical position at step 1050. Using the canonical position relationships, at step 1055 the rotation of the Z-axis relative to the canonical position of $V_4$ is determined, and at step 1060 the angle between the Z-axis and the $V_4V_2$ unit vector (theta) may be determined. A unit vector from $V_4$ to $V_2$ relative to the canonical mapping of $V_4$ using the relationship between $V_4V_2$ and the Z-axis at step 1065, and then the angle between $\overline{V4V2}$ and $\overline{V4V0}$ (alpha) can then be extracted at step 1070. Once that angle is defined, and knowing the length of $\overline{V4V2}$, one can extract the length $\overline{V4V0}$. Separately, knowing that the diagonal $\overline{V5V3}$ is equal to the length $\overline{V4V2}$, their intersection defines an isosceles triangle, (V4V5C). Given that the diagonals of a rectangular or cuboid box are equal, it follows that $\overline{V4V2}$ is equal in length to $\overline{V5V3}$ (see step 1075). One can then compute the angle, γ, between $\overline{V4V2}$ and $\overline{V4V5}$, of the isosceles triangle at step 1080. Using the law of sines, one can then determine the height and width of the box at step 1085, and at step 190, the length of the box can be determined.

Another method to detect a cuboid object is to allow the operator to interactively zoom in on the object. Once one of the defining corners of intersections is identified, it is tracked and eventually as the operator visually navigates the device to encompass the entire object, the dimensions of the object are determined. This interactive process is very powerful since it reduces lag time and reduces strain on the user by allowing them to interactively dimension the box. This is accomplished by pre-processing a portion of the object, specifically, pertaining to the top or bottom portions. Even if the corner is not clearly defined, the intersection of the planes/lines defining such corners may be used to more accurately estimate the corners.

The Relevance of Line Intersections and their Relationship to Vanishing Points

Parallel lines, intersecting at the same vanishing point will intersect other parallel lines belonging to other vanishing points. In the process, such intersections define structure of a given object. However, the number of intersections of these parallel lines is greater than the number of actual physical structural elements that are associated with a given scene or object. To identify the correct intersections and remove the ones that are erroneous from the list of candidate intersections, one may take a closer look at the intersection points themselves and attempt to follow the edges to or from the vanishing point, up to the intersection point. Depending on the direction, edges may exist before or after the intersection. They may also exist for both before and for after the intersection. Hence, there are three cases:

1) Edges exist on both sides of the intersection
2) Edges exist on only one side, closer to the vanishing point, before the intersection
3) Edges exist on only one side, farther away from the vanishing point, past the intersection Another important concept is that of line intersections. To validate line intersections, one may preferably choose to examine the neighborhood of a given line. It is preferable to try to find all edge and line-relevant data around the intersection in the direction of each line. If there are any edge data, the intersection becomes a directional intersection, i.e. edge data disappearing away from the vanishing point, such as cases 2 and 3 above, and in the direction of the intersection define an overall vector path. So, the intersection of the two lines becomes one of vector intersection instead of simply being a directionless line intersection, depicted in FIG. 6, highlighting vanishing points of line intersections. This is especially true for the outside edges defining a cuboid or non-cuboid object.

Figure 12:
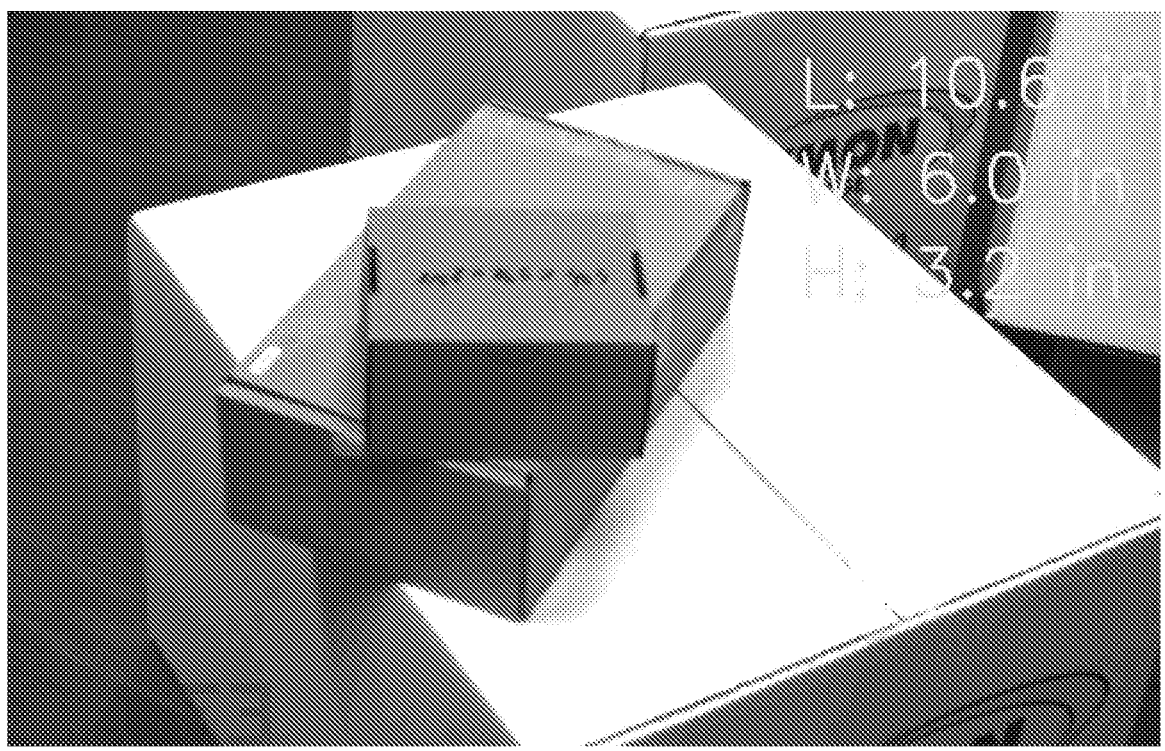
FIG. 12 depicts an occluded cuboid object dimensionable in accordance with an embodiment of the invention.
Figure 13:
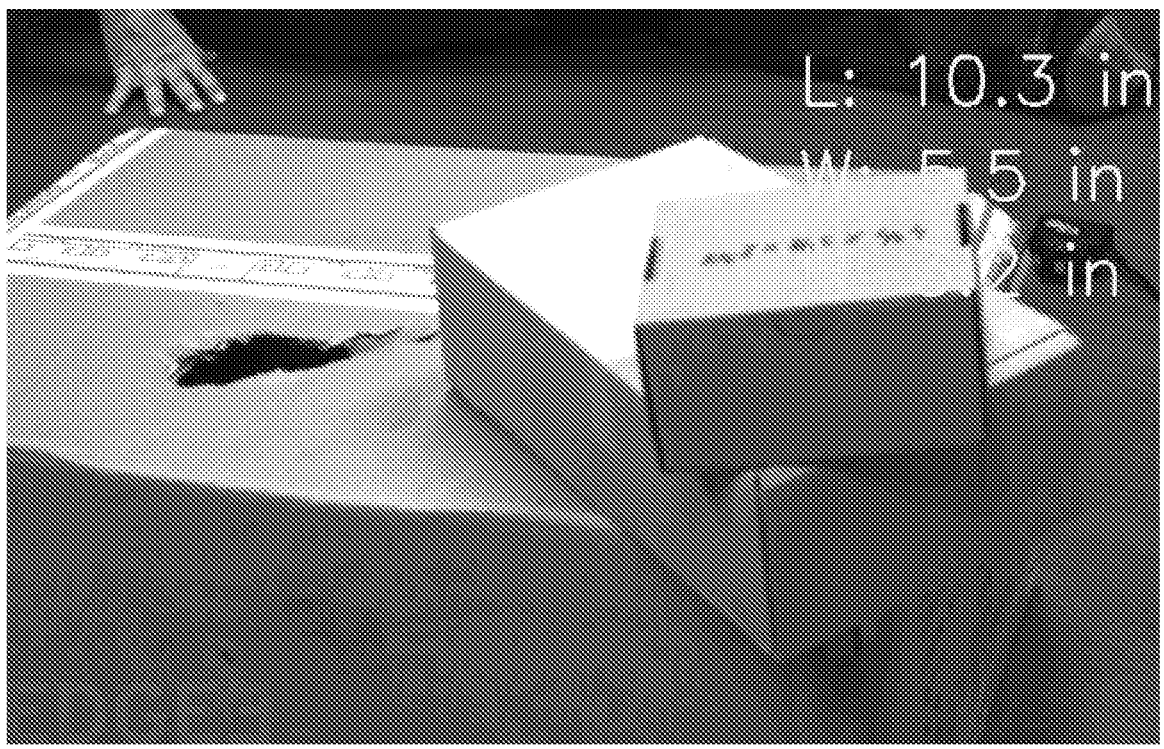
FIG. 13 depicts an occluded and deformed cuboid object dimensionable in accordance with an embodiment of the invention.
Figure 14:
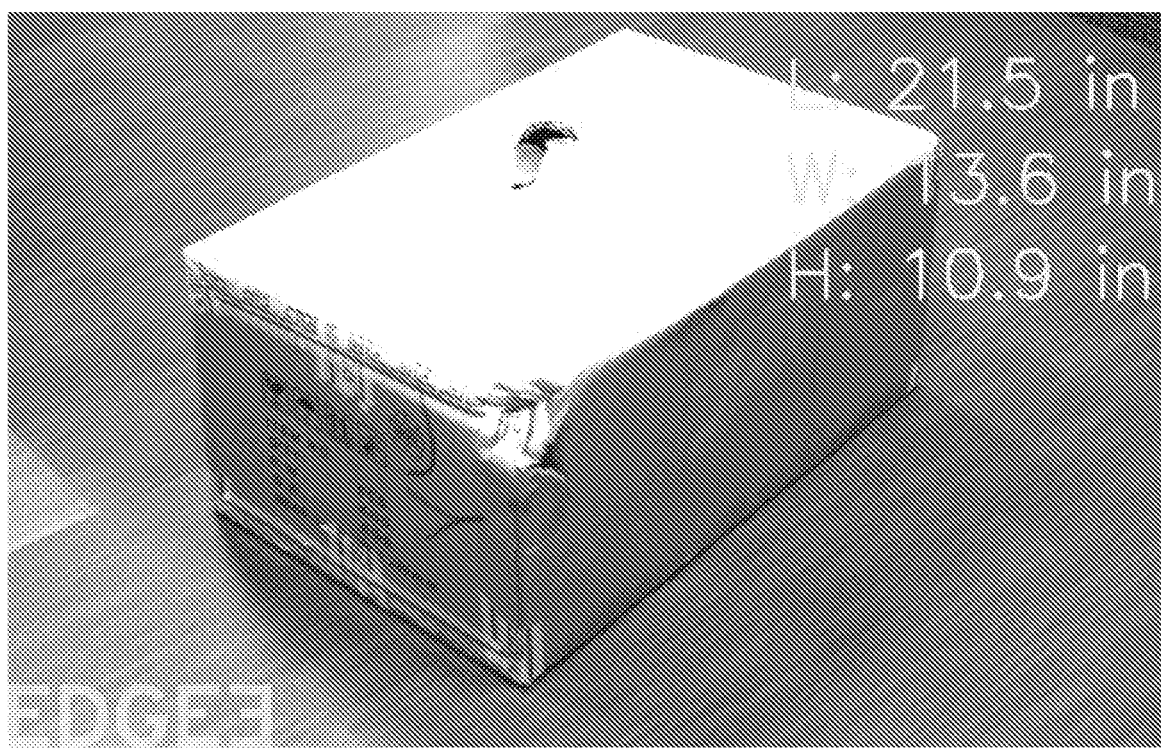
FIG. 14 depicts a deformed cublid object dimensionable in accordance with an embodiment of the invention.

Defining the dimensions of partially occluded objects. Given that line following can be utilized to define intersections, such intersections may not be visible in one or both (or more) views of the scene. In such a case, the intersection is defined as the intersection of the lines defining the surfaces, and then the intersections may be matched across multiple views, irrelevant of whether or not to have the corners in the field of view. This is especially helpful in semi-occluded objects. For instance, if a cuboid object is in the middle between top and bottom boxes. Provided that the intersections are defined, the object may still be dimensioned. Thus, as is shown in FIGS. 12, 13 and 14, various occluded, and deformed cuboid objects are depicted that may be dimensioned in accordance with one or more embodiments of the present invention.

Hypothesis Testing and Snapping Rectangular Cuboid Objects to an Edge Skeleton

For a given observation, one may find more than one candidate for the V2 and V4 vertices. For each combination of such points, one may define a hypothesis and then test whether or not that hypothesis is valid. The process may further include one or more intermediate steps, before having to go through the computations to orthographic projection and the subsequent 3D line equation extraction. For instance, one may assume that the viewing angle is always oblique when viewing a box, and hence, there is a vertical line that should always be associated with a successfully V4 candidate. However, some example V4 candidates may still have a vertical line associated with it.

One embodiment of the invention would be to run through the steps presented earlier and then create the associated box, the box may then be slightly modified to better fit the data, i.e. it may be preferable to snap the retrieved global model to fit the box data better. Such data may be extracted from the edge image itself. Hence, an iterative process is preferably defined in which a hypothesis is first presented and the error is then minimized, based on the edge data. The box's final equations may then be recomputed based on the iterative process of matching the hypothesis box equation with the edge data that is associated with it.

Structured Light

The above-described approach represents a passive stereoscopic implementation that is also extensible to multiple views. However, in order for this technique, or any other technique in passive stereo to work one needs to make sure that the scene is lit with the minimum amount of lighting requirement that enables passive stereo to function. Some drawbacks that are associated with this approach include typical passive stereo drawbacks, i.e. passive stereo suffers from cases where differentiability between the dimensioned object and the background is unclear. Also, if there is no lighting, then there is no information that is reflected back from the object that is to be dimensioned.

Moreover, there are cases where passive stereo fails. For instance, if the object to be dimensioned is white, and the background is white, then passive stereo inherently may not be able to determine a difference between the foreground and the background. In cases like these, it would be useful to supplement the above-described approach with a technique that can offer an alternative means of detecting depth discontinuities (and hence, object surfaces). This alternative embodiment of the invention therefore provides an alternate method to extract an object's characteristics and depth discontinuities, through the integrating of a light source to the scene. A simple structured pattern that is generated may aid in the identification of the contours and bounds associated with a given object, by observing the effect that different surfaces have on the pattern.

If a light source with a uniform pattern is projected on a smooth surface, the generated pattern would also be smooth. Alternatively, if that same uniform pattern is projected on a surface with varying depth, the uniform pattern will be distorted. Depth discontinuities and depth measurements can be derived from distortions in the uniform pattern. A solution is suggested that combines passive light source with a pattern. The pattern may be comprised of parallel lines or a grid.

Hence, it is possible to extend the above inventive approach to dimensioning through passive stereo by incorporating a light source, and further by adding a pattern to the system. A pattern that is generated by a cohesive light source that is coupled with a diffractive optical element (DOE) is preferred in accordance with an embodiment of the invention. A preferred pattern to choose is one made up of parallel lines as a constituent component. So, typically, a pattern of parallel lines or pattern of a square grid would be appropriate, but this is extensible to any pattern, be it straight, square, or rounded, or any other combination.

Figure 7:
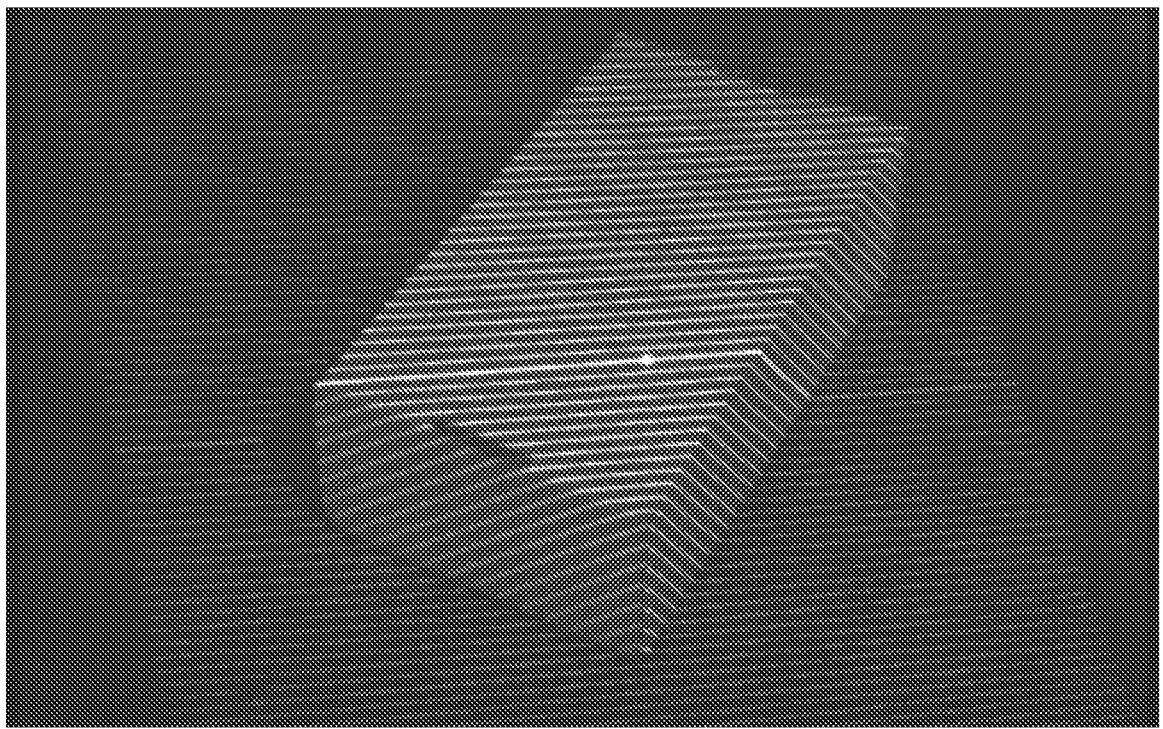
FIG. 7 depicts projection of a structured light pattern onto a cuboid object in accordance one or more embodiments of the invention.

As is shown in FIG. 7, the DOE then projects the pattern onto an object to be dimensioned. Wherever the pattern hits a flat surface, the pattern is not distorted. As a direct outcome of the light pattern hitting the object's various surfaces, the patterned light will bend differently, and hence change, once it hits different surfaces that are associated with the object that is to be dimensioned. So, for any given line, in the pattern of parallel lines, one can follow a given line—left to right or top to bottom. As the light pattern bends, it traces surface discontinuities, representing changing surfaces on the object.

This allows a pattern extractor to identify the different edges that are associated with the different surfaces, by simply tracing line discontinuities. Line segment detection is then attempted to assess line direction change, indicating a depth change or object surface discontinuity. Line direction change can be traced via first or second-moments. Once surface edges are traced out, for each view (left and right), one can then extract the lines that are also associated with the edges, representing the vanishing lines of objects. The rest of the logic follows through, as has been presented, including detection of correspondence between left and right views.

Thus, as is shown in FIG. 7, it is possible in accordance with this embodiment of the present invention to track the line discontinuities (highlighted with the arrows) traces depth discontinuities. These discontinuities define vanishing lines in the field of view, with three vanishing points, for each of the left and right images. These lines are then matched across both views to extract depth information.

In cases of near-orthographic pattern projection, where the pattern's angle may not be distinguishable in our direction as much between foreground and background, in accordance with this embodiment of the invention, it is preferable to generate a pattern in the orthogonal direction, thus orthogonal decomposition, mentioned earlier can then be used to enhance the results.

Figure 11:
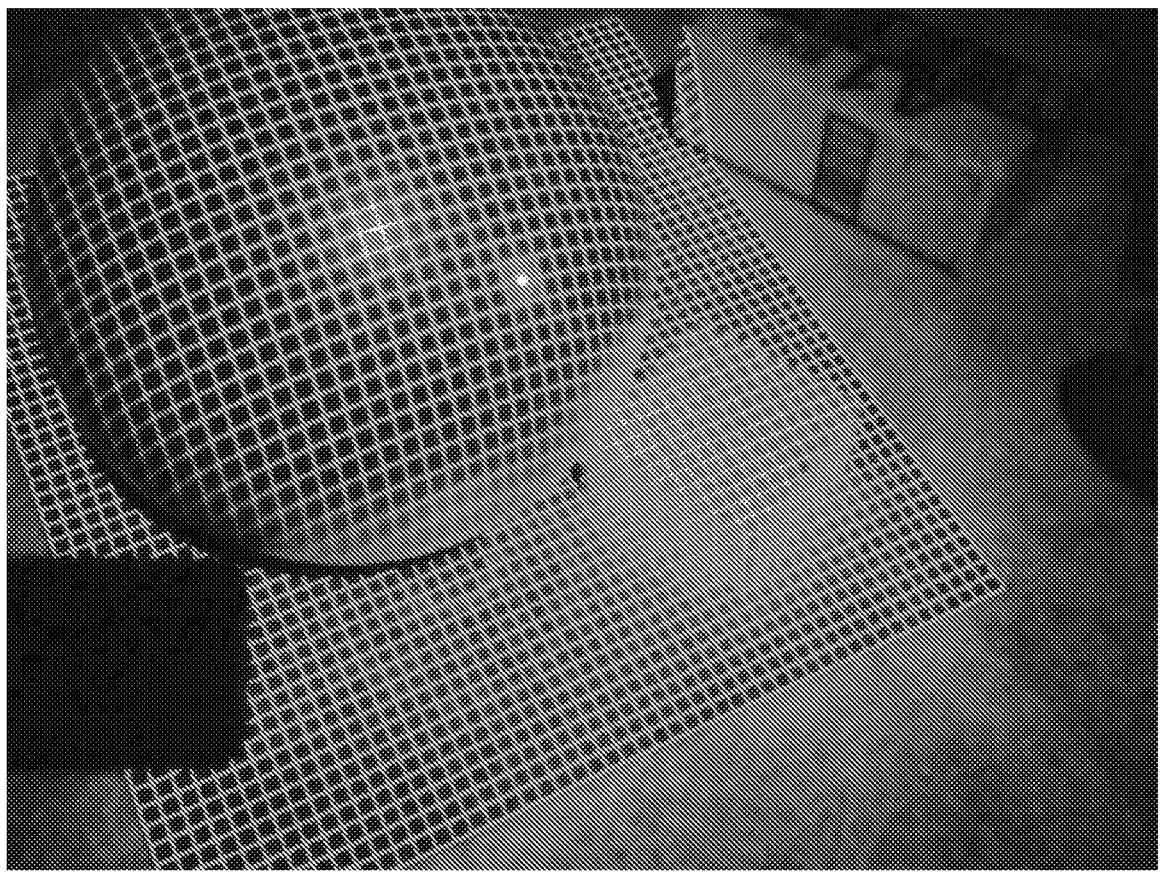
FIG. 11 depicts projection of a structured light pattern onto a plurality of objects in accordance with one or more embodiments of the invention.

Another embodiment of this approach is presented with a different pattern, such as a cross-hatch pattern, presented in FIG. 11. As is shown in FIG. 11, deflections that are associated with the pattern represent depth discontinuities and/or changes in depth. These changes are preferably highlighted, and may also be used for finding the boundaries of one or more objects, as well as regions of change in one or more of surfaces of the one or more objects. These changes are then preferably matched between left and right views, for at least a two-view process, as described above.

Extending to Other Types of Structured Objects

The concepts described above of matching vanishing points may be extended to any object. A user may choose to extract the borders of any object at all, or further break down the object into a series smaller objects. Structure from such objects is extracted, such that the vanishing points that are associated with each structure are first extracted. Once they are successfully extracted, one can then safely assume that they can be used to match disparity between the corresponding vanishing points and the real-world parallel lines whose vanishing lines' intersections define the vanishing points. This is a very powerful approach. It enables depth reconstruction with a single shot.

Extending the Above Approach to Full Scene Reconstruction and in Scene Mosaicing This is a very powerful approach that can be combined with mosaicking to produce a full reconstruction of entire human-made objects, such as rooms, houses, roads, anything that requires parallel lines in a scene. Such parallel lines may then be viewed from their projections across multiple scenes, matched across such scenes, and then have all the pixels comprising the associated parallel lines matched as well.

This may be combined with image mosaicking such that parallel lines are followed through from one scene to another, as more parallel lines get aggregated together to converge onto the same vanishing point. Across scenes, other input may be important. Such inputs include pitch, yaw, and displacement. Combining such information with existing vanishing point matched information allows us to define a continuum of vanishing lines across multiple instances of time, through displaced cameras, by mathematically compensating for the physical scene change, to continue to associate the correct scene parallel lines with the same respective vanishing point or points. As a result, mosaicking through continuous matching across the same.

Various embodiments of the present invention may be provided in accordance with an imaging apparatus, a computer processor associated therewith, and a non-transitory storage device associated therewith. Such an imaging apparatus, processor and storage device may comprise a customized hardware solution, or may comprise a standard mobile device. The various embodiments of the invention may further be provided as a dedicated software program, or may be provided as a downloadable application ("app") that may be deployed at a user selectable time. Any employed hardware apparatus may include one or more imaging cameras, and in a preferred embodiment, two such cameras are employed. Processing may be performed on the hardware device, or may be performed at a remote processing location, such as in a cloud computing environment. The hardware apparatus is preferably provided with sufficient standard systems to receive and download program and other data, and to send and upload any results of other dimensioning data. Thus, it is contemplated in accordance with the various embodiments if the invention that dimensioning data may be transferred to a package delivery management system and allow for a calculation of pricing, sizing and room on a truck or warehouse, and the like. Similarly, when dimensioning a room or hallway, it is contemplated that such data may be provided to allow for ordering of paint, flooring material, building material, insulation, etc., sizing furniture cabinets, etc., and the like.

Dimensioning irregular objects and defining a minimum bounding box. For irregular objects, the inventors of the present invention can define a minimum bounding box with just passive stereo or a passive multiview implementation. The contour of an object is preferably defined. Critical features of the contour and the object, including inflection points, SIFT feature points, etc. associated with the object and its contour are then preferably extracted and matched across views. These inflection points may then be used as depth queues to match a minimum bounding box around the object. The minimum and maximum depth dimensions, across all three dimensions may be defined based on these inflection points and the minimum bounding box may then be defined.

If a projected pattern is used in conjunction with a passive stereo or passive multiview application, then the projected pattern, along with passive stereo can be used to define deflections in the pattern, and to match such deflections between left and right viewpoints.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that this description is intended to cover all of the generic and specific features of the invention herein described and all statements of the scope of the invention which, as a matter of language, might be said to fall there between.

What is claimed:

1. A method for defining an object that is difficult to distinguish from a background, comprising the steps of:
    projecting a uniform light pattern on the object;
    imaging the object with the uniform light pattern projected thereon from a plurality of images;
    determining one or more distortions in the imaged, projected, uniform light pattern, thereby determining one or more depth discontinuities in the image; and
    determining one or more edges of the object in accordance with the one or more depth discontinuities;
    defining one or more vertices of the object by matching vanishing lines from one or more of the plurality of images to identify a first vertex and a second vertex;
    matching the one or more vertices across a plurality of the plurality of images to extract a three-dimensional vector for each of the one or more vertices;
    extracting a line segment connecting the first vertex of the one or more vertices and the second vertex of the object:
    projecting the first vertex of the object and its associated edges to a canonical system;
    projecting the three-dimensional vector associated with the second vertex also into the canonical system:
    extracting a z-component of one or more sides defining the first vertex of the object;
    projecting the line segment to the canonical system;
    extracting one or more geometric relationships between one or more sides and the line segment of the object; and
    dimensioning the object in accordance with at least the one or more geometric relationships and the line segment.

2. The method of claim 1, further comprising the step of receiving an input identifying one or more of the vertices of the object.

3. The method of claim 1, wherein the object is an irregularly shaped box.

4. The method of claim 1, wherein the object is positioned adjacent to a similarly constructed object.

5. The method of claim 1, wherein the object is an irregularly shaped object.

6. The method of claim 1, further comprising the steps of defining a depth map to identify the first vertex.

7. The method of claim 6, further comprising the steps of:
    defining a first component depth map having a first dimension;
    defining a second component depth map having a second dimension, the second dimension being substantially orthogonal to the first dimension; and
    combining the first component depth map and the second component depth map to provide the depth map.

8. The method of claim 1, wherein the plurality of images are right land left images of a stereo pair.

9. The method of claim 1, wherein three or more images are employed to image the object.

10. The method of claim 1, further comprising the step of modifying the dimensioned object in accordance with a global model.

11. A system for defining an object that is difficult to distinguish from a background, comprising:
- a projector for projecting a uniform light pattern on the object;
- an imaging apparatus for imaging the object with the uniform light pattern projected thereon from a plurality of images; and
- a processor for determining one or more distortions in the imaged, projected, uniform light pattern, thereby determining one or more depth discontinuities in the image; determining one or more edges of the object in accordance with the one or more depth discontinuities; defining one or more of vertices the object by matching vanishing lines from one or more of the plurality of images to identify a first occluded vertex and a second vertex; matching the one or more vertices across left and right viewpoints to extract a three-dimensional vector for each of the one or more vertices; extracting a line segment connecting the first occluded vertex of the one or more vertices and the second vertex of the object; projecting the first occluded vertex representative of the object and its associated edges to a canonical system; projecting the three-dimensional vector associated with the first occluded vertex also into the canonical system; extracting a z-component of one or more sides defining the first occluded vertex of the object; projecting the line segment to the canonical system; extracting one or more geometric relationships between one or more sides and the line segment of the object; and dimensioning the object in accordance with at least the one or more geometric relationships and the line segment.

12. The system of claim 11, wherein the imaging apparatus is a stereo imaging apparatus.

13. The system of claim 12, wherein the imaging apparatus employs left and right images imaged by the stereo imaging apparatus.

14. The system of claim 13, wherein the object is an irregular box.

15. The system of claim 13, wherein the object is an irregular object.

16. The system of claim 13, further comprising an input device for receiving an input indicating a location of one or more vertices of the object.

17. The system of claim 13, wherein the processor further matches vanishing lines from one or more of the left and right images to identify the first occluded vertex.

18. A non-transitory computer readable storage medium having a computer program stored thereon, the computer program causing a general purpose computer to perform the steps of:
- projecting a uniform light pattern on an object;
- imaging the object with the uniform light pattern projected thereon from a plurality of images;
- determining one or more distortions in the imaged, projected, uniform light pattern, thereby determining one or more depth discontinuities in the image; and
- determining one or more edges of the object in accordance with the one or more depth discontinuities;
- defining one or more vertices of the object by matching vanishing lines from one or more of the plurality of images to identify a first vertex and a second vertex;
- matching the one or more vertices across a plurality of the plurality of images to extract a three-dimensional vector for each of the one or more vertices;
- extracting a line segment connecting the first vertex of the one or more vertices and the second vertex of the object;
- projecting the first vertex of the object and its associated edges to a canonical system;
- projecting the three-dimensional vector associated with the second vertex also into the canonical system;
- extracting a z-component of one or more sides defining the first vertex of the object;
- projecting the line segment to the canonical system;
- extracting one or more geometric relationships between one or more sides and the line segment of the object; and
- dimensioning the object in accordance with at least the one or more geometric relationships and the line segment.

* * * * *